(12) United States Patent
Shin et al.

(10) Patent No.: US 11,347,023 B2
(45) Date of Patent: May 31, 2022

(54) LENS DRIVING DEVICE, CAMERA MODULE AND OPTICAL APPARATUS

(71) Applicant: LG INNOTEK CO., LTD., Seoul (KR)

(72) Inventors: Seung Taek Shin, Seoul (KR); Jin Suk Han, Seoul (KR); Tae Bong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 30 days.

(21) Appl. No.: 17/071,266

(22) Filed: Oct. 15, 2020

(65) Prior Publication Data

US 2021/0026100 A1 Jan. 28, 2021

Related U.S. Application Data

(63) Continuation of application No. 15/971,581, filed on May 4, 2018, now Pat. No. 10,845,566, which is a
(Continued)

(30) Foreign Application Priority Data

Mar. 19, 2015 (KR) .......................... 10-2015-0038295
Jun. 16, 2015 (KR) .......................... 10-2015-0085073

(51) Int. Cl.
*H04N 5/225* (2006.01)
*G02B 7/09* (2021.01)
(Continued)

(52) U.S. Cl.
CPC ................. *G02B 7/09* (2013.01); *G02B 7/08* (2013.01); *G02B 27/646* (2013.01);
(Continued)

(58) Field of Classification Search
CPC .......... G02B 7/09; G02B 7/08; G02B 27/646; H04N 5/2254; H04N 5/2257; H04N 5/2253; H04N 5/2252; H04N 5/23212
See application file for complete search history.

(56) References Cited

U.S. PATENT DOCUMENTS 9,360,734 B2 6/2016 Park
2006/0181632 A1* 8/2006 Makii ...................... G02B 7/02
348/335
(Continued)

FOREIGN PATENT DOCUMENTS

CN 102422185 A 4/2012
CN 103201934 A 7/2013
(Continued)

OTHER PUBLICATIONS

Office Action dated Jul. 12, 2021 in Korean Application No. 10-2015-0038295.
(Continued)

*Primary Examiner* — Mekonnen D Dagnew
(74) *Attorney, Agent, or Firm* — Saliwanchik, Lloyd & Eisenschenk

(57) ABSTRACT

An exemplary embodiment of the present invention relates to a lens driving device, comprising: a base including a support part upwardly protruded; a movable unit spaced from the base and movably disposed at an upper side of the base; and a damper contacted with the support part and the movable unit.

19 Claims, 13 Drawing Sheets

Related U.S. Application Data continuation of application No. 15/075,625, filed on Mar. 21, 2016, now Pat. No. 9,989,727.

(51) Int. Cl.
 *G02B 27/64* (2006.01)
 *G02B 7/08* (2021.01)

(52) U.S. Cl.
 CPC ......... *H04N 5/2252* (2013.01); *H04N 5/2253* (2013.01); *H04N 5/2254* (2013.01); *H04N 5/2257* (2013.01)

(56) References Cited

U.S. PATENT DOCUMENTS

| | | | |
|---|---|---|---|
| 2008/0236997 A1 | 10/2008 | Ebihara | |
| 2010/0002317 A1 | 1/2010 | Osaka et al. | |
| 2010/0192689 A1 | 8/2010 | Ulm et al. | |
| 2012/0082442 A1* | 4/2012 | Kwon | H04N 5/2253 396/55 |
| 2014/0072289 A1* | 3/2014 | Lim | G03B 13/36 396/55 |
| 2014/0091204 A1* | 4/2014 | Ezawa | G03B 5/00 250/208.1 |
| 2014/0177056 A1 | 6/2014 | Hayashi et al. | |

FOREIGN PATENT DOCUMENTS

| | | |
|---|---|---|
| CN | 103676402 A | 3/2014 |
| CN | 103901701 A | 7/2014 |
| CN | 104216199 A | 12/2014 |
| JP | 2014-225042 A | 12/2014 |
| KR | 10-2013-0062635 A | 6/2013 |
| KR | 10-2014-0135154 A | 11/2014 |
| KR | 10-2015-0007699 A | 1/2015 |
| KR | 10-2015-0008662 A | 1/2015 |

OTHER PUBLICATIONS

Office Action dated Aug. 25, 2017 in U.S. Appl. No. 15/075,625.
Office Action dated Sep. 9, 2019 in Chinese Application No. 201610161958.8.
Restriction Requirement dated Apr. 6, 2017 in U.S. Appl. No. 15/075,625.
Notice of Allowance dated Feb. 6, 2018 in U.S. Appl. No. 15/075,625.
Office Action dated May 22, 2020 in Chinese Application No. 201610161958.8.
Restriction Requirement dated Oct. 4, 2019 in U.S. Appl. No. 15/971,581.
Office Action dated Dec. 31, 2019 in U.S. Appl. No. 15/971,581.
Notice of Allowance dated Jul. 15, 2020 in U.S. Appl. No. 15/971,581.
Office Action dated Feb. 10, 2022 in Korean Application No. 10-2015-0085073.

* cited by examiner

LENS DRIVING DEVICE, CAMERA MODULE AND OPTICAL APPARATUS

CROSS-REFERENCE TO RELATED APPLICATIONS

This application is a continuation of U.S. application Ser. No. 15/971,581, filed May 4, 2018; which is a continuation of U.S. application Ser. No. 15/075,625, filed Mar. 21, 2016, now U.S. Pat. No. 9,989,727, issued Jun. 5, 2018; which claims benefit under 35 U.S.C. § 119 of Korean Application Nos. 10-2015-0038295, filed Mar. 19, 2015, and 10-2015-0085073, filed Jun. 16, 2015; all of which are hereby incorporated by reference in their entirety.

TECHNICAL FIELD

The teachings in accordance with the exemplary embodiments of this present disclosure generally relate to a lens driving device, a camera module and an optical apparatus.

BACKGROUND

This section provides background information related to the present disclosure which is not necessarily prior art.

Concomitant with popularization of various mobile phones and commercialization of wireless Internet services, consumer demands in relation to mobile phones have diversified and various types of peripheral devices have been mounted on mobile phones. One of the representative peripheral devices is a camera module capturing a subject in a photo or a video.

Recently, a camera module having an AF (Auto Focusing) function or an OIS (Optical Image Stabilization) function is used. Furthermore, the camera module having the AF function or the OIS function requires an elastic member movably supporting a lens relative to an image sensor.

Meantime, a conventional camera module needs use of feedback control for more accurate control. This case, however, suffers from a disadvantage of a phenomenon where an elastic member oscillates when an external force corresponding to resonant frequency of the elastic member is applied.

BRIEF SUMMARY

The technical subject to be solved by the present disclosure is to provide a lens driving device improved in gain (value) in resonant frequency of a support member.

Furthermore, another technical subject to be solved by the present disclosure is to provide a lens driving device having a damper for prevention of oscillation phenomenon of an elastic member. Still another technical subject to be solved by the present disclosure is to provide a lens driving device having a damper loss prevention structure to inhibit loss of coated damper.

Still furthermore, the technical subject to be solved by the present disclosure is to provide a camera module configured to obtain performances of an AF function and an OIS function through the lens driving device and an optical apparatus.

In one general aspect of the present disclosure, there is provided a lens driving device, comprising: a base including a support part upwardly protruded; a movable unit spaced from the base and movably disposed at an upper side of the base; and a damper contacted with the support part and the movable unit.

In some exemplary embodiments, the movable unit may include a staircase part disposed at a periphery of the movable unit and having a shape corresponding to that of the support part, wherein the damper is contacted with the support part and the staircase part.

In some exemplary embodiments, the staircase part may include a protruding part outwardly protruded from a periphery of the movable unit, and a recessed part disposed at a lower side of the protruding part, wherein a lateral surface of the support part faces the periphery of the movable unit forming the recessed part, and an upper surface of the support part faces a lower side of the protruding part.

In some exemplary embodiments, the movable unit may include a first mover coupled to the lens unit and including a first movable element, and a second mover including a second movable element facing the first movable element and disposed at an outside of the first movable element, wherein the first movable element is movably disposed relative to the second mover by electromagnetic interaction between the first movable element and the second movable element.

In some exemplary embodiments, the movable unit may include a support member coupled to the first movable element and to the second movable element, wherein the damper improves a gain of a resonant frequency of the support member.

In some exemplary embodiments, the movable unit may include a second movable element disposed at an upper side of the base and including a second mover, wherein the lens driving device comprises a stator including a third movable element facing the second movable element and disposed between the second mover and the base, and the second mover is movably disposed relative to the stator by electromagnetic interaction between the second mover and the third mover.

In some exemplary embodiments, at least a part of the support part may be overlapped with the staircase part to an optical axis direction, and wherein a height of the support part may be so formed as to minimize a tilt amount when the second mover moves to a direction perpendicular to the optical axis direction relative to the stator in order to perform an OIS (Optical Image Stabilization) function.

In some exemplary embodiments, the second mover may include a magnet, wherein the second mover may further include a housing fixed in a manner the magnet is adhered to an inner upper side of the magnet, and wherein an outside of the housing may be disposed at a position corresponding to that of the magnet with the staircase part.

In some exemplary embodiments, at least a part of the support part may be overlapped with the staircase part to an optical axis direction, and wherein an upper end of the support part may be equal in height to or higher than a centroid of the magnet.

In some exemplary embodiments, at least a part of the support part may be overlapped with the staircase part to the optical axis direction, and wherein a height of the support part may be so formed as not to allow the magnet to drop out, even if the support part strikes the staircase part when the second mover moves or tilts to a direction perpendicular to the optical axis direction.

In some exemplary embodiments, the lens driving device may further comprise: a sensor unit sensing the second mover; and a controller performing an OIS function feedback of the second mover through a sensing value sensed by the sensing unit.

In some exemplary embodiments, the lens driving device may further comprise: a lateral support member coupled to the base and the movable unit to elastically support the movable unit relative to the base, and wherein the damper may improve a gain of a resonant frequency of the lateral support member.

In some exemplary embodiments, the staircase part may include a first surface opposite to an upper surface of the support part, and a second surface opposite to an inner lateral surface of the support part, and may further include a first groove arranged with the damper.

In some exemplary embodiments, the first groove may be disposed at a corner area joined by the periphery of the housing and the first surface, and the damper may be disposed at a lower surface of loss prevention part protruded to outside from the periphery of the housing, a periphery of the housing and an upper surface of the pillar part.

In some exemplary embodiments, the staircase part may further include a second groove disposed at the upper surface of support part and arranged with the damper.

In some exemplary embodiments, the second groove may be formed by the upper surface of the support part being recessed to a lower side, and the second groove may include a second groove upper surface parallel with the upper surface of the support part, a second groove lateral surface perpendicular to the upper surface of the support part, and a second groove slope slantly connecting the second groove upper surface with the second groove lateral surface.

In some exemplary embodiments, the staircase part may further include a third groove formed at a corner area joined by the upper surface of the support part and the inner lateral surface.

The lens driving device according to an exemplary embodiment of the present disclosure may further comprise: a base; a movable unit distanced from the base and movably disposed at an upper side of the base; a protruder protruded from the periphery of the base to an outside; and a damper contacting the base and the protruder.

In another general aspect of the present disclosure, there is provided a camera module, comprising: a PCB (Printed Circuit Board) mounted with an image sensor; a base disposed at an upper surface of the PCB and including a hollow hole formed at a position corresponding to that of the image sensor; a support part formed at the base and protrusively formed from an outside of the hollow hole to an upper side; a housing spaced from the base to be movably disposed at an upper side of the base; a support member coupled to the base and the housing; a staircase part disposed at a periphery of the housing and having a shape corresponding to that of the support part; and a damper contacting the support part and the staircase part.

In still another general aspect of the present disclosure, there is provided a camera module, comprising: a body; a display unit arranged at one surface of the body to display information; and a camera module mounted at the body to photograph an image or a photograph, wherein the camera module includes: a PCB (Printed Circuit Board) mounted with an image sensor; a base disposed at an upper surface of the PCB and including a hollow hole formed at a position corresponding to that of the image sensor; a support part formed at the base and protrusively formed from an outside of the hollow hole to an upper side; a housing spaced from the base to be movably disposed at an upper side of the base; a support member coupled to the base and the housing; a staircase part disposed at a periphery of the housing and having a shape corresponding to that of the support part; and a damper contacting the support part and the staircase part.

In order to solve the abovementioned subject, the lens driving device according to an exemplary embodiment of the present disclosure may comprise: a base; a housing disposed at an upper side of the base and movably supported by the base; a pillar unit protruded upward from the base; a pillar accommodation unit formed at the housing and disposed with the pillar unit; and a damper interposed between the pillar unit and the housing.

The pillar accommodation unit may include a first surface opposite to an upper surface of the pillar unit, and a second surface opposite to an inner lateral surface of the pillar unit, and may further include a first groove disposed at the first surface and arranged with the damper.

The first groove may be disposed at a corner unit joined by an outer lateral surface of the housing and the first surface, and the damper may be disposed at a bottom surface of a loss prevention unit protruded from the outer lateral surface of the housing to outside, the outer lateral surface of the housing and an upper surface of the pillar unit.

A second groove disposed at an upper surface of the pillar unit and arranged by the damper may be further included.

The second groove may be configured in a manner such that an upper surface of the pillar unit is formed concaved at a bottom surface, and the second groove may include a second groove upper surface formed in parallel with the upper surface of the pillar unit, a second groove lateral surface formed perpendicular to the upper surface of the pillar unit, and a second groove slop slantly connecting the second groove upper surface and the second groove lateral surface.

A third groove may be further included that is formed at a corner unit joined by the upper surface of the pillar unit and an inner lateral surface.

The third groove may include a plurality of recessed parts concaved at an inner lateral surface of the pillar unit, and a protruding part disposed in the plurality of recessed parts.

The pillar accommodation unit may include a first surface opposite to the upper surface of the pillar unit, a second surface opposite to an inner lateral surface of the pillar unit, where the second surface may further include a fourth groove so arranged as to have a separation space from the inner lateral surface of the pillar unit, arranged at the first surface and disposed at an upper surface of the separation space.

At least a part of the second surface may slant toward an inner side as it advances downwards.

The pillar unit may be disposed at a corner of the base, and a part of the housing may be disposed at an inner side of the pillar unit.

A lateral support member may be further included that movably supports the housing to a horizontal direction.

The lateral support member may include leaf springs each arranged at each external lateral surface of the housing.

Further included may be a bobbin disposed at an upper side of the base and an inner side of the housing, a first driving unit disposed at the bobbin, a second driving unit disposed at the housing to move the first driving unit through electromagnetic interaction, and a third driving unit disposed at the base to move the second driving unit through electromagnetic interaction.

The first driving unit and the third driving unit may include a coil, and the second driving unit may include a magnet.

A sensor unit to detect movement of the second driving unit may be further included, and a power applied to the third driving unit may be feedback-controlled in response to the movement of the second driving unit detected by the sensor unit.

The camera module according to an exemplary embodiment of the present disclosure may comprise: a lens module; a bobbin accommodating the lens module at an inner side; a housing disposed at an outside of the housing to movably support the bobbin; a base movably supporting the housing; a pillar unit protruded upward from the base; a pillar accommodation unit formed at the housing and disposed by the pillar accommodation unit; and a damper interposed between the pillar unit and the pillar accommodation unit.

An optical apparatus according to an exemplary embodiment of the present disclosure may comprise: a body; a display unit arranged at one surface of the body to display information; and a camera module mounted at the body to photograph an image or a photograph, wherein the camera module includes: a lens module; a bobbin accommodating the lens module therein; a housing disposed at an outside of the bobbin to movably support the bobbin; a base disposed at a lower side of the housing to movably support the housing; a pillar unit protruded upward from the base; a pillar accommodation unit formed at the housing and disposed by the pillar unit; and a damper interposed between the pillar unit and the pillar accommodation unit.

Advantageous Effects

The present disclosure has an advantageous effect in that gain at the resonant frequency of a support member can be improved to inhibit an oscillation phenomenon of the support member, through which an OIS function can be improved. Furthermore, loss of damper inhibiting resonance of elastic member can be inhibited to secure performances of AF function or OIS function.

DETAILED DESCRIPTION

Figure 1:
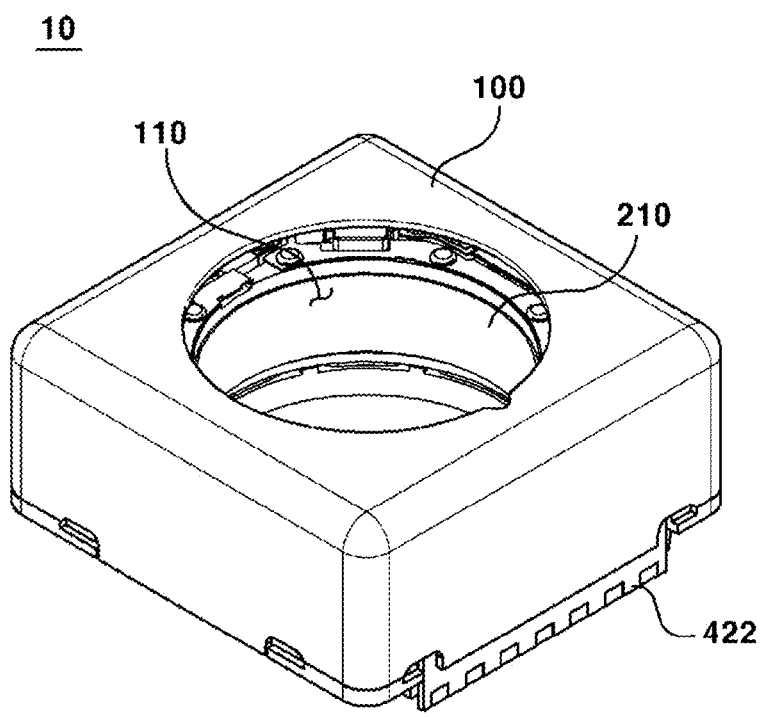
FIG. 1 is a schematic perspective view illustrating a lens driving device according to an exemplary embodiment of the present disclosure.

Various exemplary embodiments will be described more fully hereinafter with reference to the accompanying drawings, in which some exemplary embodiments are shown.

In describing the present disclosure, detailed descriptions of constructions or processes known in the art may be omitted to avoid obscuring appreciation of the invention by a person of ordinary skill in the art with unnecessary detail regarding such known constructions and functions. In the drawings, the size and relative sizes of layers, regions and/or other elements may be exaggerated or reduced for clarity.

In describing elements of exemplary embodiments according to the present disclosure, although the terms first, second, A, B, (a), (b), etc. may be used herein to describe various elements, these elements should not be limited by these terms, and these terms are only used to distinguish one element from another. For example, a first region/layer could be termed a second region/layer, and, similarly, a second region/layer could be termed a first region/layer without departing from the teachings of the disclosure.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

The hereinafter used term of PCB is an abbreviation of Printed Circuit Board, and FPCB is an abbreviation of Flexible PCB. An FP coil stands for a Fine Pattern(ed) coil. Furthermore, the term of protruding part may be interchangeably used with lug.

Hereinafter, configuration of optical apparatus according to an exemplary embodiment of the present disclosure will be described in detail with reference to the accompanying drawings.

Although the optical apparatus according to an exemplary embodiment of the present disclosure may include a mobile phone, a portable phone, a smart phone, a portable smart device, a digital camera, a laptop computer, a digital broadcasting terminal, a PDA (Personal Digital Assistant), a PMP (portable Multimedia Player), a navigational device, etc., the present disclosure is not limited thereto, and any devices capable of photographing an image or a photograph may be included.

The optical apparatus according to an exemplary embodiment of the present disclosure may a body (not shown), a display unit (not shown) arranged at one surface of the body to display information, and a camera (not shown) mounted on the body and having a camera module (not shown) to photograph an image or a photograph.

Hereinafter, configuration of camera module will be described with reference to the accompanying drawings.

The camera module may include a lens driving device (10), a lens module (not shown), an IR (Infra-red) cut-off filter (not shown), a PCB (not shown), an image sensor (not shown) and a controller (not shown).

The lens module may include at least one lens (not shown) and a barrel accommodating at least one lens. However, one configuration of lens module is not limited to a lens barrel, and any holder structure capable of supporting at least one lens will suffice. The lens module may be screw-connected to the lens driving device (10), for example. The lens module may be coupled to an inner side of the lens driving device (10), for example. Meantime, light having passed the lens module may be irradiated on an image sensor.

The IR cut-off filter may inhibit the light from being incident on an IR region of an image sensor. The IR cut-off filter may be interposed between the lens module and the image sensor, for example. The IR cut-off filter may be mounted on a base (500, described later) and may be coupled to a holder member (not shown). The IR cut-off filter may be mounted on a hollow hole (510) formed at a center of the base (510). The IR cut-off filter may be formed with a film material or glass material, for example. Meantime, the IR cut-off filter may be formed by coating an IR cut-off coating material on a flat optical filter such as protective cover glass and cover glass, for example.

The PCB may support the lens driving device (10). The PCB may be mounted with an image sensor. To be more specific, the PCB may be disposed at an upper external side with the lens driving device (10) and may be disposed at an upper inner side with the image sensor. Through this configuration, the light having passed the lens module coupled to an inner side of the lens driving device (10) may be irradiated on the image sensor mounted on the PCB. The PCB can supply an electric power to the lens driving device (10). Meantime, the PCB may be disposed with a controller for controlling the lens driving device (10).

The image sensor may be mounted on the PCB. The image sensor may be disposed on the same optical axis as that of the lens module, through which the image sensor can obtain the light having passed the lens module. The image sensor may output the irradiated light in an image. The image sensor may be a CCD (Charge Coupled Device), a MOS (Metal Oxide Semi-Conductor), a CPD and a CID, for example. However, the type of image sensor is not limited thereto.

The controller may be mounted on the PCB. The controller may be disposed at an inner side of the lens driving device (10), and may be also arranged at a camera module substrate outside of the lens driving device (10). The controller may control a current direction, current intensity and amplitude supplied to each element forming the lens driving device (10). The controller may perform any one function of auto focusing function and handshake correction function by controlling the lens driving device (10). That is, the controller may control to move the lens module to an optical axis direction or to a direction perpendicular to the optical axis direction or to tilt the lens module. Furthermore, the controller can perform a feedback control of the auto focusing function and the handshake correction function.

Hereinafter, the configuration of lens driving device (10) will be described in detail with reference to the accompanying drawings.

Figure 2:
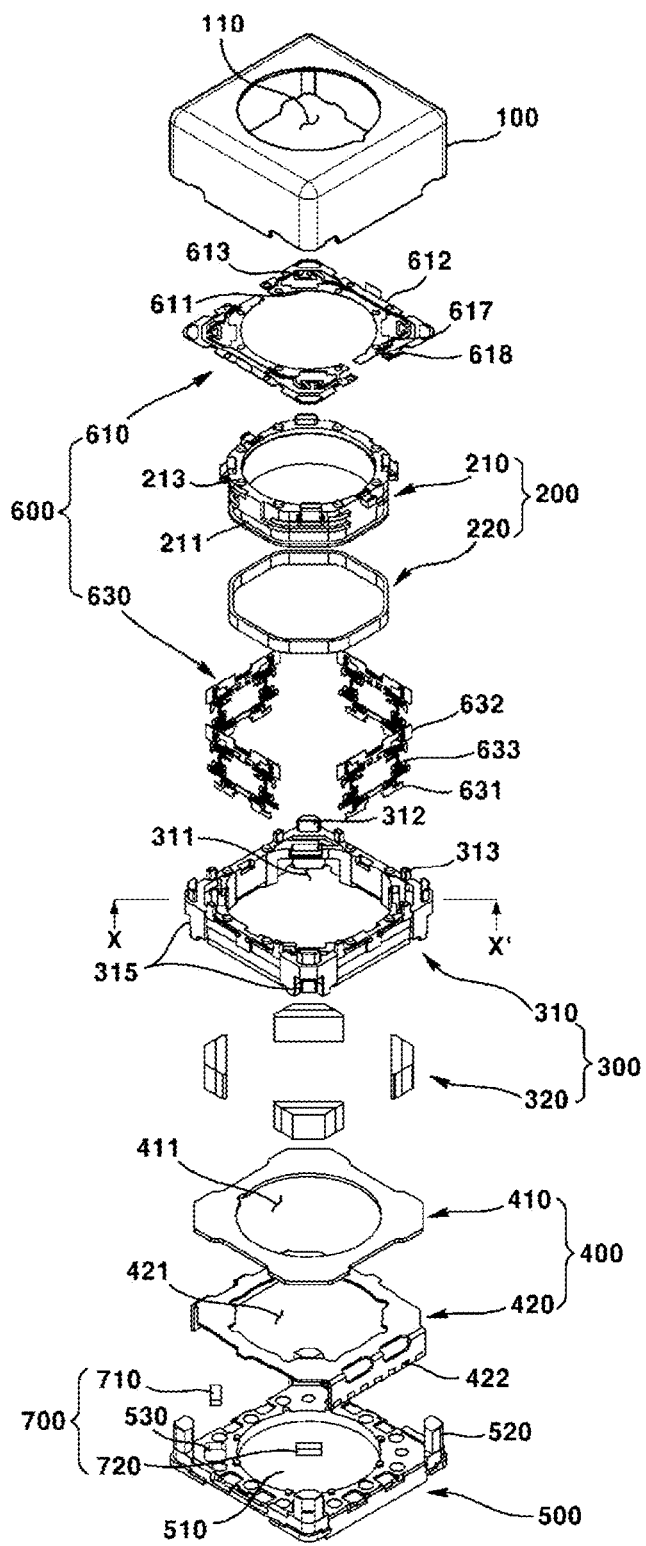
FIG. 2 is a schematic exploded perspective view illustrating a lens driving device according to an exemplary embodiment of the present disclosure.

FIG. 1 is a schematic perspective view illustrating a lens driving device according to an exemplary embodiment of the present disclosure, and FIG. 2 is a schematic exploded perspective view illustrating a lens driving device according to an exemplary embodiment of the present disclosure.

Referring to FIG. 1, the lens driving device (10) according to an exemplary embodiment of the present disclosure may include a cover (100), a first mover (200), a second mover (300), a stator (400), a base (500), a support member (600), a sensor unit (700) and a damper (800). However, the lens driving device (10) according to an exemplary embodiment of the present disclosure may omit one or more elements from the cover (100), the first mover (200), the second mover (300), the stator (400), the base (500), the support member (600), the sensor unit (700) and the damper (800). The first mover (200) and the second mover (300) according to an exemplary embodiment of the present disclosure are commonly called a movable unit.

The cover (100) may constitute an external look of the lens driving device (10). The cover (100) may take a hexahedron shape opened at the bottom according to an exemplary embodiment. However, the shape is not limited thereto. Meantime, the cover (100) may be mounted at an upper surface of the base (500). An inner space formed by the cover (100) and the base (500) may be disposed with the first mover (200), the second mover (300), the stator (400) and the support member (600). Furthermore, the cover (100) may be mounted on the base (500) by being adhered to, at an inner lateral surface, to a part of the lateral surface or to the whole lateral surface of the base (500, described later), through which configuration, the cover can protect an inner elements against the external shock and function as an infiltration prevention of external pollutant materials.

The cover (100) may perform a function of a shield can by being equipped with a metal material, for example. In this case, the cover (100) can protect the elements of the lens driving device (10) against an external electronic interference generated from a mobile phone and the like. However, the material of cover (100) is not limited thereto.

The cover (100) may include an opening (110) exposing the lens module, one of the camera module by being formed at an upper surface. That is, the light introduced through the opening (110) can be transmitted to an image sensor through the lens module. Furthermore, although the lens driving device (10) according to an exemplary embodiment of the present disclosure may not include a lens module, the lens driving device (10) according to other exemplary embodiment may include the lens module.

The first mover (200) may be disposed at an outer side of the lens module. That is, the lens module may be disposed at an inner side of the first mover (200). The peripheral surface of the lens module may be coupled to the inner surface of the first mover (200). Meantime, the first mover (200) may integrally move with the lens module through interaction with the second mover (300) or the stator (400). That is, the first mover (200) can move the lens module.

The first mover (200) may include a bobbin (210). Furthermore, the first mover (200) may include a first movable element (220) coupled to the bobbin (210). The bobbin (210) may be coupled at an inner surface to a peripheral surface of the lens module. Meantime, the bobbin (210) may be coupled by the first mover (200). Furthermore, the bobbin (210) may be coupled at an upper surface with an upper support member (610). The bobbin (210) may move relative to a housing (310). The bobbin (210) may include a first guide unit (211) guiding the first movable element (220) to be wound or mounted. The first guide unit (211) may be integrally formed with an outer lateral surface of the bobbin (210). Furthermore, the first guide unit (211) may be continuously formed along an outer lateral surface of the bobbin (210), or discretely formed at a predetermined gap.

The bobbin (210) may include a coupling lug (213) coupled to the upper support member (610). The coupling lug (213) may be coupled by being inserted into a first coupling groove (617) of the upper support member (610). Meantime, the upper support member (510) may be formed with a lug and the bobbin (210) may be formed with a groove, where the lug and the groove may be coupled. The bobbin (210) may be formed with a total of eight (8) coupling lugs (213) according to an exemplary embodiment as illustrated in FIG. 2, where each of the eight coupling lugs may be respectively coupled to the upper support member (610) where the coupling lugs (213) are separably mounted.

The first movable element (220) may be disposed opposite to a second movable unit (320) of the second mover (300). The first movable element (220) may move the bobbin (210) relative to the housing (310) through the electromagnetic interaction with second movable unit (320). The first movable element (220) may include a coil. The coil may be guided to the first guide unit (211) to be wound on a periphery of the bobbin (210). Furthermore, the coil is configured in a manner such that four coils, for example, are independently disposed where adjacent two coils constitute a 90° angle therebetween and arranged on the periphery of the bobbin (210).

When first movable element (220) includes a coil, an electric power supplied to the coil may be supplied through the upper support member (610). Meantime, when the electric power is supplied to the coil, an electromagnetic field may be formed about the coil. Furthermore, the first movable element (220) may include a magnet. Here, the second movable element (320) may also include a coil. The second movable element (320) may be disposed at an outside of the first movable element (220) opposite to the first movable element (220).

The second mover (300) may include the housing (310) disposed at an outside of the bobbin (210). Furthermore, the second mover (300) may be disposed opposite to the first mover (200) and include the second movable element (320) fixed to the housing (310).

The housing (310) may be formed in a shape corresponding to that of an inner lateral surface of the cover (100) forming an external look of the lens driving device (100). Furthermore, the housing (310) may be formed with an insulating material, and may be injection molded in consideration of productivity. The housing (310) is a part moving for an OIS (Optical Image Stabilization) driving, and may be discretely arranged from the cover (100) at a predetermined distance.

The housing (310) may be opened at an upper side and a bottom side to movably and vertically accommodate the first mover (200). The housing (310) may include at a lateral surface a movable accommodation unit (311) formed with a shape corresponding to that of the second movable element (320) to accommodate the second movable element (320). That is, the movable accommodation unit (311) may fix the second movable element (320) by accommodating the second movable element (320). Meantime, the movable accommodation unit (311) may be disposed at an inner surface or an outer surface of the housing (310).

The housing (310) may include a stopper (312) protruded upwards to absorb an external shock by contacting a bottom side of an upper surface of the cover (100) when there is generated the external shock. The stopper (312) may be formed in plural number. The stopper (312) may be such that each stopper (312) is formed at each of four corners or four edges, for example, as illustrated in FIG. 2, but the present disclosure is not limited thereto. Meantime, the stopper (312) may be integrally formed with the housing (310).

The housing (310) may be coupled at an upper surface by the upper support member (610). The housing (310) may include a coupling lug (323) coupled to the upper support member (610). The coupled lug (323) may be coupled by being inserted into a second coupling groove (618) of the upper support member (610). Meantime, the upper support member (610) may be formed with a lug and the housing (310) may be formed with a groove, where the lug is inserted into the groove for coupling. The housing (310) may be formed with a plurality of coupling lugs (313). The housing (310) may be formed with a total of eight (8) coupling lugs (313) as illustrated in FIG. 2, for example. However, the present disclosure is not limited thereto.

The housing (310) may include a staircase part (315) formed at a circumferential surface. That is, a total of four (4) staircase parts (315) may be formed at corners joined by each lateral surface adjacent to the housing (310), for example. The staircase part (315) may be explained with a lower side being concaved compared with an upper side. That is, the staircase part (315) may be formed by a protruded portion and a concave portion being joined to form a staircase. A lower side of the staircase part (315) may be disposed with a support part (520) of the base (500). A damper (800) may be coated between the staircase part (315) and the support part (520). The damper (800, describe later) may improve a resonant frequency gain value of the support member (600). Furthermore, the damper (800) may minimize a phenomenon where the support member (600) oscillates at a resonant frequency, and minimize a phenomenon where the housing (310) oscillates at a resonant frequency.

The second movable element (320) may be disposed opposite to the first movable element (220) of the first mover (200). The second movable element (320), like the first movable element (220), can move the first movable element (220) through electromagnetic interaction with the first movable element (220). The second movable element (320) may include a magnet. The magnet may be fixed to the movable accommodation unit (311) of the housing (310). Four (4) magnets, for example, may be disposed as illustrated in FIG. 2. The four magnets are independently disposed, and two adjacent magnets may form a 90° therebetween and be arranged at the housing (310). That is, the second movable element (320) may be mounted at an equidistant gap on a corner joined by adjacent lateral surfaces of the housing (310). That is, an inner side of the corner mutually joined by adjacent lateral surfaces of the housing (310) may be mounted with the second movable element (320), and an outer side may be disposed with the staircase part (315). Furthermore, the second movable element (320) may be adhered to the housing (310) using an adhesive, but the present disclosure is not limited thereto. Meantime, the first movable element (220) may include a magnet, and the second movable element (320) may include a coil.

The stator (400) may be disposed opposite to a lower side of the second mover (300). Meantime, the stator (400) may move the second mover (300) in a fixed state. Furthermore, the stator (400) may be centrally disposed with through holes (411, 421) corresponding to the lens module. The stator (400) may include a third movable element (410) disposed opposite to the lower side of the second movable element (320). The stator (400) may include an FPCB (Flexible PCB, 420) interposed between the third movable element (410) and the base (500).

The third movable element (410) may include a coil. In this case, when the coil of the third movable element (410) is applied with a power, the housing (310) fixed with the second movable element (320) may be moved by interaction with the second movable element (320). The third movable element (410) may be mounted on the FPCB or may be electrically connected. Meantime, the third movable element (410) may be centrally disposed with a through hole (411) to allow a light signal of the lens module to pass through. Furthermore, in consideration of miniaturization of the lens driving device (reduction of height to z axis direction which is an optical axis direction), the third movable element (410) may be formed with an FP coil, which is a patterned coil and may be arranged on the FPCB (420).

Furthermore, the third movable element (410) may include a coil arranged at a lower surface of the second movable element (320) spaced apart at a predetermined distance, and the coil may be arranged in correspondence to the number of the second movable element (320). That is, when the number of the second movable element (320) is four (4), as in the exemplary embodiment, and four (4) coils may be arranged, where the coil may be mounted on the FPCB (420), or formed in an FP coil to be arranged on the FPCB (420).

The FPCB (420) may be disposed between the third movable element (410) and the base (500). Meantime, the FPCB (420) may supply a power to the third movable element (410). Furthermore, the FPCB (420) may supply a power to the first movable element (210) through the lateral support member (630) and the upper support member (610). The FPCB (420) may include a through hole (421) at a position corresponding to that of the through hole (411). Furthermore, the FPCB (420) may include a terminal unit (422) bent to be exposed to outside. The terminal unit (422) may be connected to an outside power through which the power may be supplied to the FPCB (420).

The base (500) may support the stator (400). The base (500) may support the second mover (300). The base (500) may be disposed at a lower surface with a PCB (not shown). The base (500) may include a hollow hole (510) formed at a position corresponding to that of the through holes (411, 421) of the stator (400). In this case, the base may function as a sensor holder protecting an image sensor (not shown). The base (500) may be formed with a lug to a lower side direction along a lateral surface. Furthermore, the base (500) may be arranged at a lower surface with a separate sensor holder (not shown). In this case, the sensor holder may be arranged at a lower surface of the base (500) and coupled to the PCB. Meantime, the base (500) may be disposed for positioning an IR (Infrared Ray) filter (not shown) as mentioned above. That is, the hollow hole (510) of the base (500) may be coupled by the IR filter.

The base (500) may further include a foreign object collecting unit (not shown) to collect foreign objects introduced into the cover (100), for example. Meantime, the base (500) may further include a sensor accommodation groove (530) to accommodate the sensor unit (700). The base (500) may include two independent sensor accommodation grooves (530) to independently accommodate a first sensor (710) and a second sensor (720), for example. The sensor accommodation groove (530) may be disposed in a shape corresponding to that of the first sensor (710), or the second sensor (720). The sensor accommodation groove is formed in plural number to respectively accommodate a plurality of sensors. The sensor accommodation groove (530) may be so disposed as to sense all movements of x axis direction and y axis direction of the second mover (300) through the first sensor (710) and the second sensor (720). For example, the sensor accommodation groove (530) may be formed at a corner of the base (500). Furthermore, two sensor accommodation grooves (530) may form a 90° angle therebetween about an optical axis.

The base (500) may be mounted with a terminal member, and the base (500) may be integrally formed with a terminal using a surface electrode, for example. The support member (600) may connect the first mover (200) and the second mover (300). The support member (600) may elastically connect the first mover (200) and the second mover (300) to allow the first mover (200) to enable a relative movement relative to the second mover (300). That is, the support member (600) may be formed with an elastic member. The support member (600) may include an upper support member (610) and a lateral support member (630) as an exemplary embodiment illustrated in FIG. 2. Furthermore, the support member (600) may further include a lower support member (not shown). The lower support member may be coupled to a lower surface of the bobbin (210) and to a lower surface of the housing (310). The lower support member may be a leaf spring.

The upper support member (610) may be connected to an upper surface of the first mover (200) and an upper surface of the second mover (300). To be more specific, the upper support member (610) may be coupled to an upper surface of bobbin (210) and to an upper surface of housing (310). A first coupling groove (617) of the upper support member (610) may be coupled to a coupling lug (213) of the bobbin (210), and a second coupling groove (618) of the upper support member (610) may be coupled to a coupling lug (313) of the housing (310). The upper support member (610) may be a leaf spring, for example. Meantime, the first coupling groove (617) and the second coupling groove (618) may be respectively formed with a hole. In this case, the hole may be coupled by the coupling lug (213) of the bobbin (210) and by the coupling lug (313) of the housing (310).

The upper support member (610) may include an inner unit (611) connected to the bobbin (210), an outer unit (612) connected to the housing (310) and a connector (613) connecting the inner unit (611) and the outer unit (612), for example. That is, the inner unit (611) may be coupled to the bobbin (210). The inner unit (611) may be provided with a first coupling groove (617) and the bobbin (210) may be provided with a coupling lug (213) to allow the coupling lug (213) to be inserted into the first coupling groove (617) for mutual coupling therebetween. The outer unit (612) may be coupled to the housing (310). The outer unit (612) may be provided with a second coupling groove (618) and the housing (310) may be provided with a coupling lug (313) to allow the coupling lug (313) to be inserted into the second coupling groove (618) for mutual coupling therebetween. The connector (613) may elastically connect the inner unit (611) and the outer unit (612). Meantime, the inner unit (611), the outer unit (612) and the connector (613) may be integrally formed, and may be formed by being bent more than twice. However, the present disclosure is not limited thereto.

The upper support member (610) may be separated to two pieces, for example. Each of the separated upper support members (610) may be connected to the first movable element (220) to supply a power to the first movable element (220). The upper support member (610) may be connected to the lateral support member (630) and receive a power from the lateral support member (630) and supply the power to the first movable element (220).

The bobbin (210) can vertically mover relative to the housing (310), because the upper support member (610) elastically supports the bobbin (210) and the housing (310). That is, the auto focusing function may be realized by elastic support of the upper support member (610) and electromagnetic interaction between the first movable element (220) and the second movable element (320).

The lateral support member (630) may be fixed at one end to the stator (400) or to the base (500) and may be fixed at the other end to the second mover (300). Furthermore, the lateral support member (630) may be fixed at one end to the stator (400) or to the base (500) and may be fixed at the other end to the upper support member (610). The lateral support member (630) may elastically support the second mover (300) to allow the second mover (300) to horizontally move or to tilt. Furthermore, the lateral support member (630) may be coupled to the upper support member (610) and may further include a configuration for shock absorption.

The configuration for shock absorption may be formed at more than one of the lateral support member (630) and the upper support member (610). The configuration for shock absorption may include an elastic transformation unit (not shown). Furthermore, the configuration for shock absorption may be realized through shape change on a part of any one of the lateral support member (630) and the upper support member (610). As an exemplary embodiment, four (4) lateral support members (630) may be formed. However, the present disclosure is not limited thereto.

The lateral support member (630) may be electrically conductive with the upper support member (610) to receive a power from the FPCB (420) and transmit the power to the upper support member (610). In other words, the lateral support member (630) may receive a power supplied from the stator (400) and supply the power to each of the upper support members (610). The lateral support member (630) may be determined in the number thereof in consideration of symmetry, for example. A total of four (4) lateral support members (630) may be formed each on the lateral surface of the housing (310), for example.

The lateral support member (630) may include a lower unit (631), an upper unit (632) and a connector (633). To be more specific, the lateral support member (630) may include a lower unit (631) coupled to the stator (400) or to the base (500). The lateral support member (630) may include the upper unit (632) coupled to the second mover (300) or to the upper support member (610). The lateral support member (630) may include the connector (633) elastically connecting the lower unit (631) and the upper unit (632). The lateral support member (630) may be a leaf spring, for example. Furthermore, the lateral support member (630) may be a wire, for example. However, the present disclosure is not limited thereto.

The sensor unit (700) may be used for AF (Auto Focus) feedback and/or OIS (Optical Image Stabilization) feedback. That is, the sensor unit (700) may detect the position and/or movement of the first mover (200) and/or second mover (300). The sensor unit (700) may be disposed at the stator (400). The sensor unit (700) may receive a power from the FPCB (420) and transmit a sensing value by being disposed at an upper surface or a bottom surface of the FPCB (420) of the stator (400). The sensor unit (700) may be disposed at the sensor accommodation groove (530) formed at the base (500), for example. The sensor unit (700) may include a Hall sensor according to an exemplary embodiment of the present disclosure. In this case, the sensor unit (700) may sense the magnetic field of the second movable element (320) at the second mover (300) to sense a relative movement of the second mover (300) relative to the stator (400). That is, the sensor unit (700) may provide information for OIS feedback by detecting a horizontal movement or tilt of the second mover (300).

The sensor unit (700) may include a first sensor unit (710) and a second sensor unit (720), for example. The first sensor unit (710) may sense movement of x axis direction of the second mover (300). Meantime, the second sensor unit (720) may sense movement of y axis direction of the second mover (300). Furthermore, the first sensor unit (710) may sense movement of y axis direction of the second mover (300), and the second sensor unit (720) may sense movement of x axis direction of the second mover (300). That is, movement of x axis and y axis directions of second mover (300) and/or tilt amount can be all sensed by the first sensor unit (710) and the second sensor unit (720). Furthermore, the sensor unit (700) may further include a third sensor unit (not shown) in order to sense the movement of z axis direction through the first sensor unit (710) and the second sensor unit (720). The third sensor unit may be arranged at any one of the second mover (300) or the first mover (200) to sense the movement of z axis direction of the first mover (200).

Hereinafter, some of the configurations of the lens driving device (10) will be described with reference to the drawing.

Figure 3:
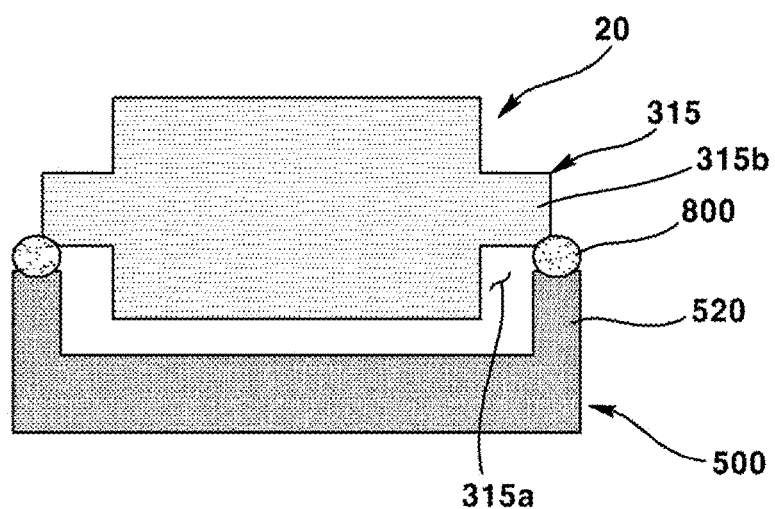
FIG. 3 is a schematic cross-sectional view taken along line X-X' of FIG. 2 illustrating some elements of lens driving device according to an exemplary embodiment of the present disclosure.

FIG. 3 is a schematic cross-sectional view taken along line X-X' of FIG. 2 illustrating some elements of lens driving device according to an exemplary embodiment of the present disclosure.

Referring to FIG. 3, the lens driving device (10) according to an exemplary embodiment of the present disclosure may include a movable unit (20), a base (500) and a damper (800), where the movable unit (20) may include a first mover (200), a second mover (300) and an upper support member (610), for example.

The movable unit (20) may be movably disposed at an upper surface of the base (500). To be more specific, the movable unit (20) may be supported by being spaced from the base (500) through the lateral support member (630). The OIS function may be implemented relative to an image sensor disposed at a bottom surface of the base (500) in response to the movable unit (20) being moved or tilted to a lateral side relative to the base (500).

The movable unit (20) may be disposed by being spaced from a support part (520). The movable unit (20) may be disposed at an inner side of the support part (520) disposed at four corners, or edges of the base (500) having a square cross-sectional shape, for example. That is, the movable unit (20) may be restricted in movement to a lateral side by the support part (520). Furthermore, the movable unit (20) may be at least partially overlapped to a horizontal direction with the support part (520).

Explanation to the first mover (200) and second mover (300) of the movable unit (20) may be inferred from the foregoing explanation. That is, the movable unit (20) may perform the auto focusing function and/or OIS function as a power is applied. The movable unit (20) may include at a periphery thereof a staircase part (315) having a shape corresponding to that of the support part (520).

The staircase part (315) may include a recessed part (315a) more concaved than a surrounding area, and a protruding part (315b) more protruded than a surrounding area, for example. That is, the staircase part (315) may be formed by the recessed part (315a) disposed at a lower side and the protruding part (315b) disposed at an upper side. Meantime, the support part (520) may be disposed by being spaced from both the recessed part (315a) and the protruding part (315b). A damper (800) may be coated on a discrete space between the recessed part (315a) and the protruding part (315b). That is, the damper (800) may be disposed between an upper surface of the support part (520) and a lower surface of the protrude (315b). Furthermore, the discrete space between the support part (520) and the recessed part (315a) may form a horizontal discrete space of the movable unit (20). That is, the horizontal moving space of the movable unit (20) may be restricted by the discrete space between the support part (520) and the recessed part (315a).

The support part (520) may be formed by being protruded upwards of the base (500). A total of four (4) support parts 52) may be formed at edges or corners. However, the present disclosure is not limited thereto. The support part (520) may be formed in a shape corresponding to that of the staircase part (315). Between the support part (520) and the staircase part (315) is there disposed the damper (800). The damper (800) may be interposed between the support part (520) and the staircase part (315). The damper (315) may include a cushioning material to absorb a vibrating energy, for example. The damper (800) may be coated on the support part (520) and the staircase part (315) to change the frequency characteristics of the support member (600). The damper (800) may improve a gain of secondary resonant frequency of the support member (600), the detailed description of which will be provided hereinunder.

Hereinafter, operation of some elements of the lens driving device (10) will be described in detail with reference to the drawing.

Figure 4:
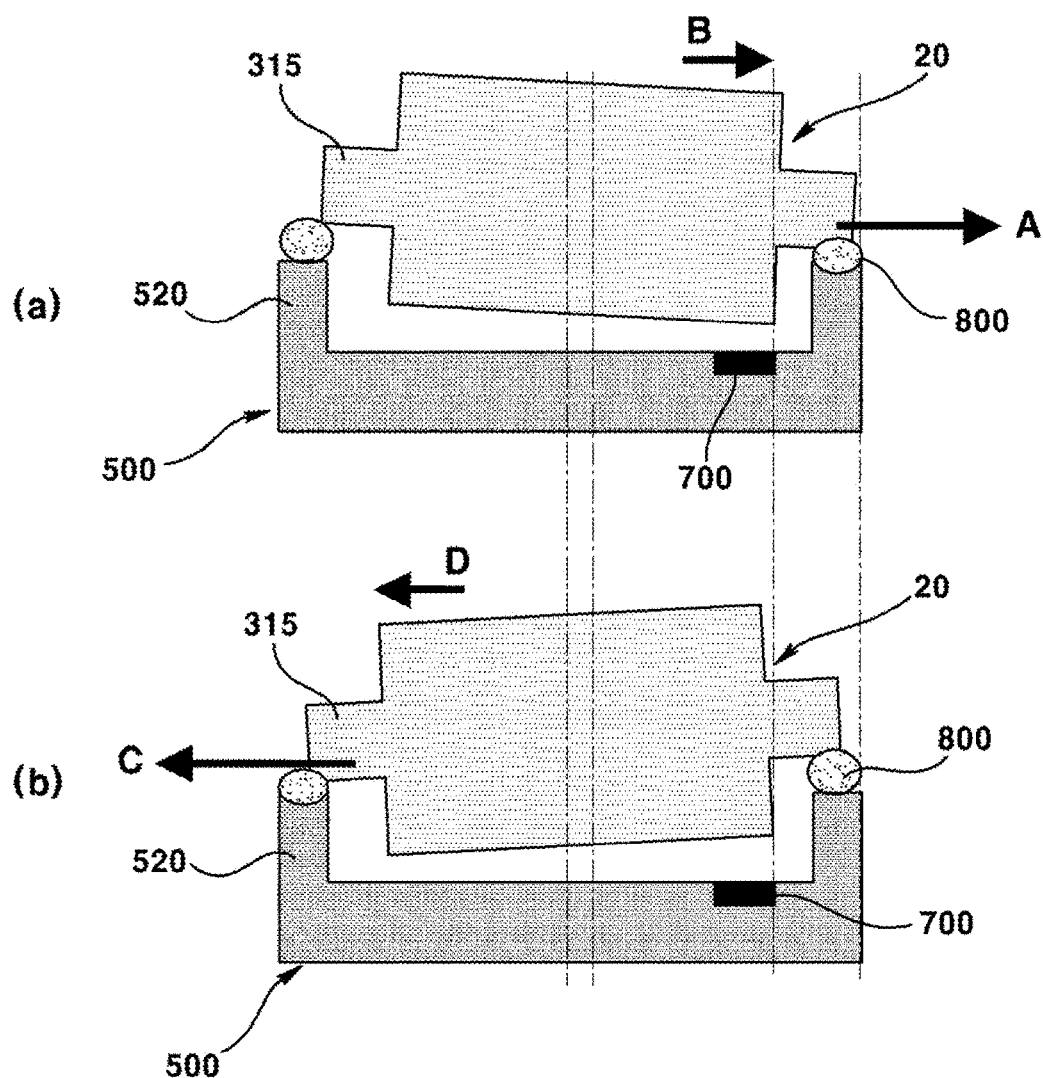
FIG. 4 is a schematic cross-sectional view illustrating operations of some elements of a lens driving device according to an exemplary embodiment of the present disclosure.

FIG. 4 is a schematic cross-sectional view illustrating operations of some elements of a lens driving device according to an exemplary embodiment of the present disclosure. To be more specific, FIG. 4(a) illustrates a case where the movable unit (20) is moved to the right side (A), and FIG. 4(b) illustrates a case where the movable unit (20) is moved to the left side (C).

Referring to FIG. 4(a), when the movable unit (20) is moved to a horizontal right direction (A) for OIS control, it can be ascertained that a tilt (B) to a right direction (a direction where left side is being upwardly lifted) is generated by the damper (800) coated between the support part (520) of the base (500) and the staircase part (315) of the movable unit (20). Meantime, with reference to FIG. 4(b), when the movable unit (20) is moved to a horizontal left direction (C) for OIS control, it can be ascertained that a tilt (D) to a left direction (a direction where right side is being upwardly lifted) is generated by the damper (800) coated between the support part (520) of the base (500) and the staircase part (315) of the movable unit (20). Meantime, there is a need to minimize an amount of tilts because the tilts (B, D) of FIG. 4(a, b) may be factors to decrease the OIS functions.

Figure 5:
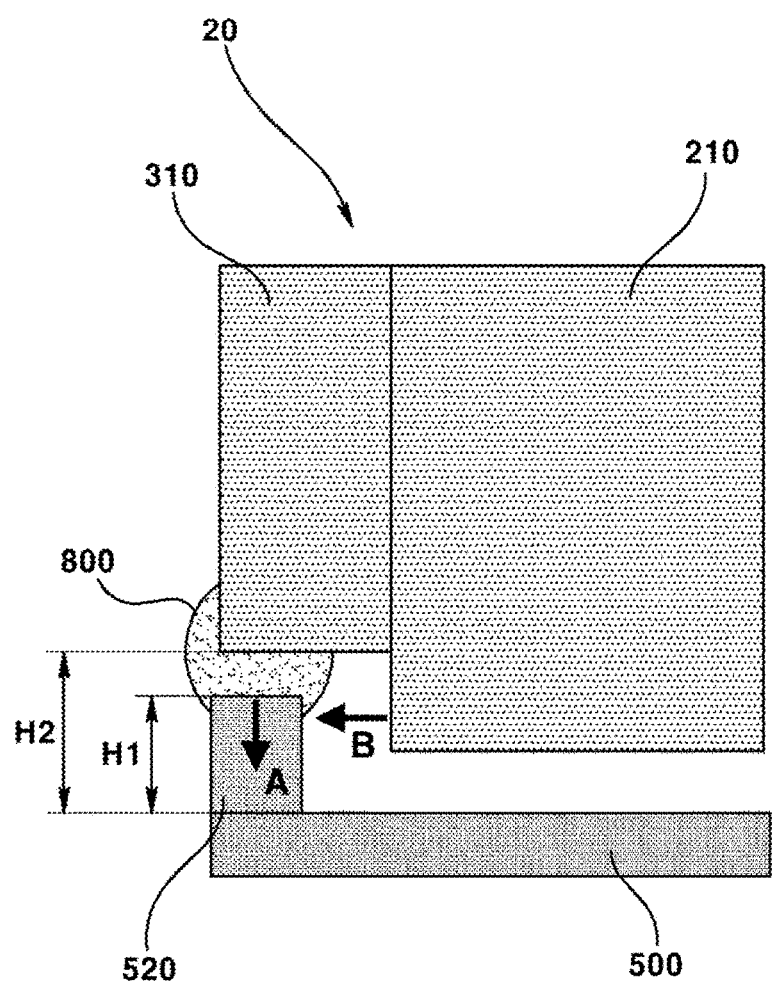
FIG. 5 is a schematic cross-sectional view illustrating some elements of a lens driving device according to an exemplary embodiment of the present disclosure.

FIG. 5 is a schematic cross-sectional view illustrating some elements of a lens driving device according to an exemplary embodiment of the present disclosure.

Referring to FIG. 5, the lens driving device (10) according to an exemplary embodiment of the present disclosure may include a movable unit (20), a base (500) and a damper coated between the movable unit (20) and the base (500), where the movable unit (20) may include a bobbin (210) disposed at an inside and a housing (310) disposed at an outside. That is, the damper (800) may be disposed between the housing (310) and the base (500). Meantime, as discussed through FIG. 4, the unexpected tilts generated during OIS control (movements or tilts to horizontal direction) of the movable unit (20) require to be minimized in their amount. Thus, the lens driving device (10) according to an exemplary embodiment of the present disclosure minimizes the amounts of unexpected tilts by adjusting a height of the support part (520) of the base (500). Meantime, the lens driving device (10) according to an exemplary embodiment of the present disclosure may be explained as minimizing the amounts of unexpected tilts by adjusting a distance between an upper surface of the base (500) and the housing (310).

The height of the support part (520) (see H1 of FIG. 5) may be so formed as to allow the amounts of tilts to be minimized when the second mover (300) is moved to a horizontal direction relative to the stator (400). That is, the height (H1) of the support part (520) may be lower than a height of the support part (520) of FIG. 3 (see A of FIG. 5). In this case, as the height of the support part (520) decreases, a tilt center (rotational center) of the movable unit (20) also decreases to reduce the amount of tilt. That is, the consideration of improvement in OIS function may determine an upper limit of the height of the support part (520).

Meantime, the height (H1) of the support part (520) may be so formed as not to allow the second movable element (320) formed by a magnet to be detached even when the support part (520) strikes the staircase part (315) and when the second mover (300) is moved or tilted to a horizontal direction. That is, at least a part of the support part (520) is overlapped with the staircase part (315) to a vertical direction, a distal end of the support part (520) may be disposed at a height equal to or higher than a weight center of the second movable element (320) formed by a magnet. If the height of the support part (520) is low, there is a fear that the support part (520) may strike a lower end of the housing (310) to detach the magnet adhered by an adhesive to an inner upper surface of the housing (310). That is, the consideration of prevention of magnet detachment may determine a lower limit of height of support part (520).

That is, the height (H1) of support part (520) may be so formed as not to detach the magnet adhered to an inner upper surface of the housing (310) even if the housing (310) is stricken while minimizing the amount of unexpected tilt during OIS control of the movable unit (20). Furthermore, a distance (H2) between an upper surface of the base (500) and the housing (310) may be so formed as not to detach the magnet adhered to an inner upper surface of the housing (310) even when the support part (520) strikes the housing (310) while minimizing the amount of unexpected tilt during OIS control of the movable unit (20). Here, the distance (H2) between the upper surface of the base (500) and the housing (310) may be limited by a distance between the upper surface of the base (500) and the staircase part (315) of the housing (310).

That is, the lens driving device (10) according to an exemplary embodiment of the present disclosure may minimize the generation of unexpected tilt during OIS control by adjusting the height (H1) of the support part (520) and/or the height (H2) between the upper surface of the base (500) and the housing (310). Meantime, as illustrated in FIG. 5, inasmuch as addition of height of damper (800) to the height (H1) of the support part (520) becomes the distance (H2) between the upper surface of the base (500) and the housing (310) according to the exemplary embodiment of the present disclosure, when one of the height (H1) of the support part (520) and the distance (H2) between the upper surface of the base (500) and the housing (310) is determined, the other one can be also determined.

Meanwhile, as illustrated as B in FIG. 5, a tiltable space of the movable unit (20) can be also reduced by reduction of the discrete space between the bobbin (210) and the support part (520) of the base (500). Hereinafter, operation of the lens driving device according to an exemplary embodiment of the present disclosure will be described in detail with reference to the drawing.

Figure 6:
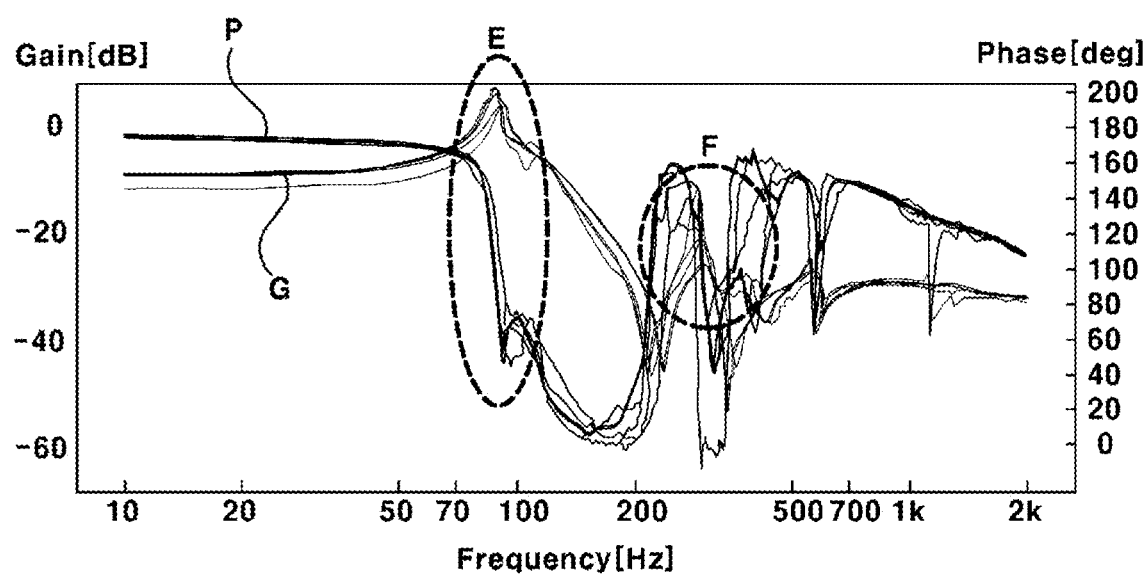
FIGS. 6 and 7 are frequency characteristic graphs explaining an effect of lens driving device according to an exemplary embodiment of the present disclosure.
Figure 7:
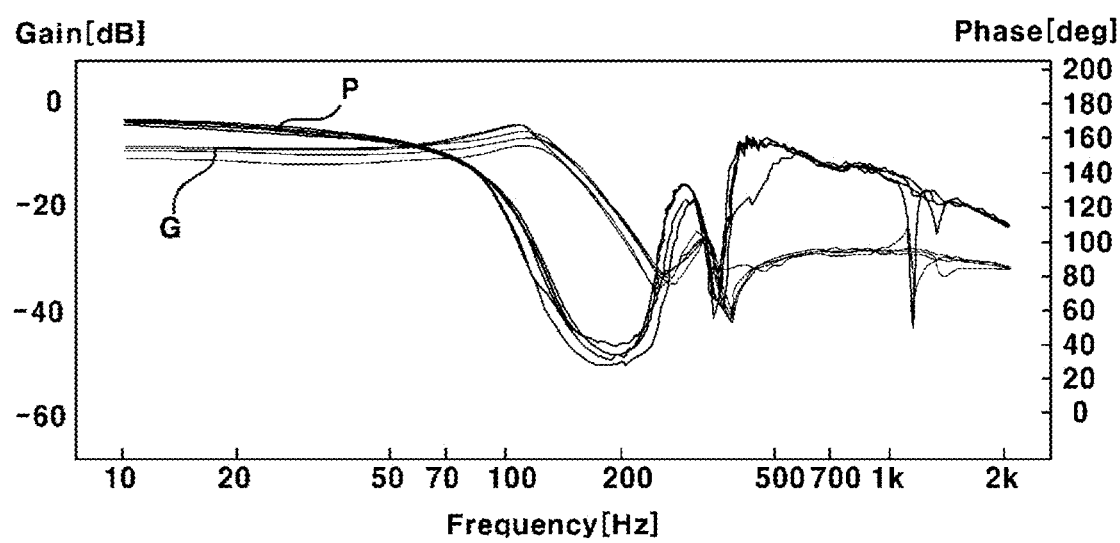

FIG. 2 is a schematic exploded perspective view illustrating a lens driving device according to an exemplary embodiment of the present disclosure, and FIGS. 6 and 7 are frequency characteristic graphs explaining an effect of lens driving device according to an exemplary embodiment of the present disclosure. To be more specific, both FIGS. 6 and 7 illustrate the frequency characteristics of support member (600) in response to inputted frequency as gain (G) and phase (P), where FIG. 6 illustrates a frequency characteristic of support member (600) when the damper (800) is not coated, while FIG. 7 illustrates a frequency characteristic of support member (600) when the damper (800) is coated.

The lens driving device (10) according to an exemplary embodiment of the present disclosure may receive a power from outside through a terminal (422) of the FPCB (420) of the stator (400). Meantime, the FPCB (420) may supply the received power to the third movable element (410) formed with an FP (Fine Pattern) coil. Furthermore, the FPCB (420) may supply the power to the first movable element (220) formed with a coil through the lateral support member (630) and the upper support member (610).

When a power is supplied to the first movable element (220), the first mover (200) is vertically moved based on the second mover (300) by the electromagnetic interaction with the second movable element (320) formed with a magnet. That is, as the power is supplied to the first movable element (220), the bobbin (210) is moved to an optical axis direction relative to the housing (320) to perform the auto focusing function.

Meantime, the first mover (200) or the second mover (300) may be formed with a sensor unit (not shown) sensing the movement of the first mover (200). The sensor unit may provide a sensing value to a controller (not shown) by sensing the movement of the first mover (200) in order to perform the auto focusing feedback.

When a power is supplied to the third movable element (410), the second mover (300) is horizontally moved based on the stator (400) by the electromagnetic interaction with the second movable element (320) formed with a magnet. That is, as the power is supplied to the second movable element (320), the movable unit (20) is moved to a horizontal direction relative to the base (500) to perform the OIS function. However, the present disclosure is not limited thereto, and the second mover (300) may be tilted relative to the stator (400) in order to perform the OIS function.

Meantime, the movement of second mover (300) may be sensed by the power-receiving sensor unit (700) through the FPCB (420). For example, the first sensor (710) may sense the movement of second mover (300) to x axis direction, and the second sensor (720) may sense the movement of second mover (300) to y axis direction. That is, the sensor unit (700) can sense the horizontal movement of the second mover (300), and furthermore, the sensor unit (700) may be also so formed as to sense the amount of tilt of the second mover (300).

The movement amount (displacement) or position of the second mover (300) sensed by the sensor unit (700) may be provided to a controller. The position information of the second mover (300) provided to the controller may be used for OIS function feedback. That is, the controller performs the OIS function feedback using the position information of the second mover (300) transmitted by the sensor unit (700).

Meantime, referring to FIG. 6, when the OIS function feedback is performed, and when the damper (800) is not coated between the movable unit (20) and the support part (520) of the base (500), it can be ascertained that oscillation may be generated from the first resonant frequency (see E of FIG. 6) of the support member (600) and from the second resonant frequency (see F of FIG. 6) of the support member (600).

Thus, the lens driving device (10) according to an exemplary embodiment of the present disclosure minimizes the oscillation phenomenon of the support member (600) by coating the damper (800) between the base (500) and the support part (520) as illustrated in FIG. 7. When FIG. 6 and FIG. 7 are compared, it can be ascertained that rate of change in the second resonant frequency of support member (600) illustrated as F in FIG. 7 grows lower than that of the resonant frequency of support member (600) illustrated as E in FIG. 6.

Furthermore, decrease in OIS function may be resulted from the damper (800) between the movable unit (20) and the base (500), which is due to generation of unexpected tilt of movable unit (20) by the damper (800) during horizontal direction control of the movable unit (20). Thus, the lens driving device (10) according to an exemplary embodiment of the present disclosure minimizes the decrease in OIS function by limiting the height of the support part (520) of the base (500). Here, the height (see H of FIG. 5) of the support part (520) may be so formed as to inhibit the magnet adhered to an inner upper surface from being detached even if the housing (310) is stricken while minimizing the amount of unexpected tilt during OIS control of the movable unit (20) as discussed in the foregoing, whereby, the lens driving device (10) according to an exemplary embodiment of the present disclosure can inhibit the decrease in OIS function while minimizing the oscillation phenomenon of the support member that may be generated from the resonant frequency.

Hereinafter, configuration of a lens driving device (1010) according to an exemplary embodiment of the present disclosure will be described in detail with reference to the drawing.

Figure 8:
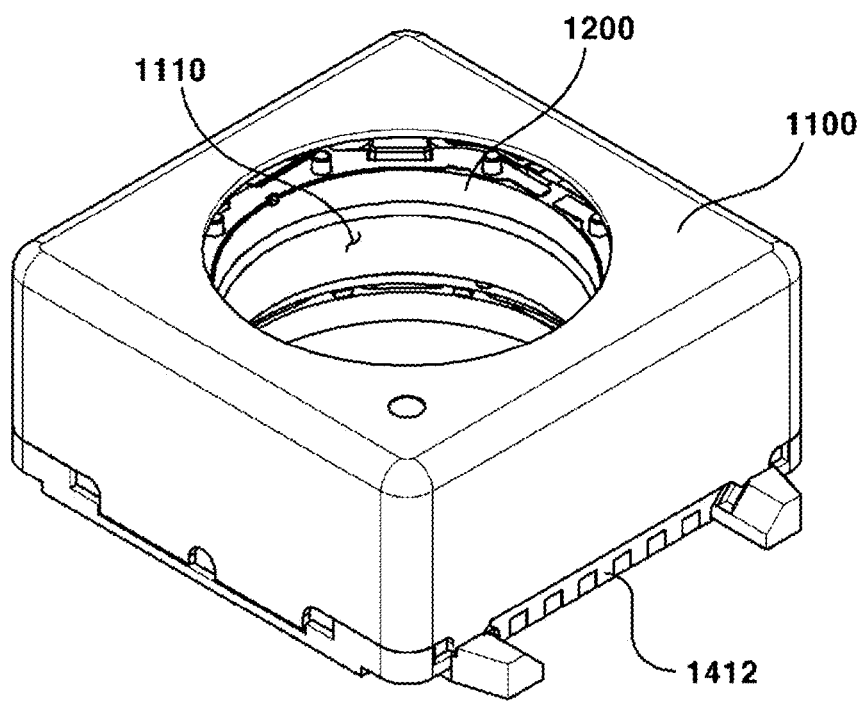
FIG. 8 is a schematic perspective view illustrating a lens driving device according to an exemplary embodiment of the present disclosure.
Figure 9:
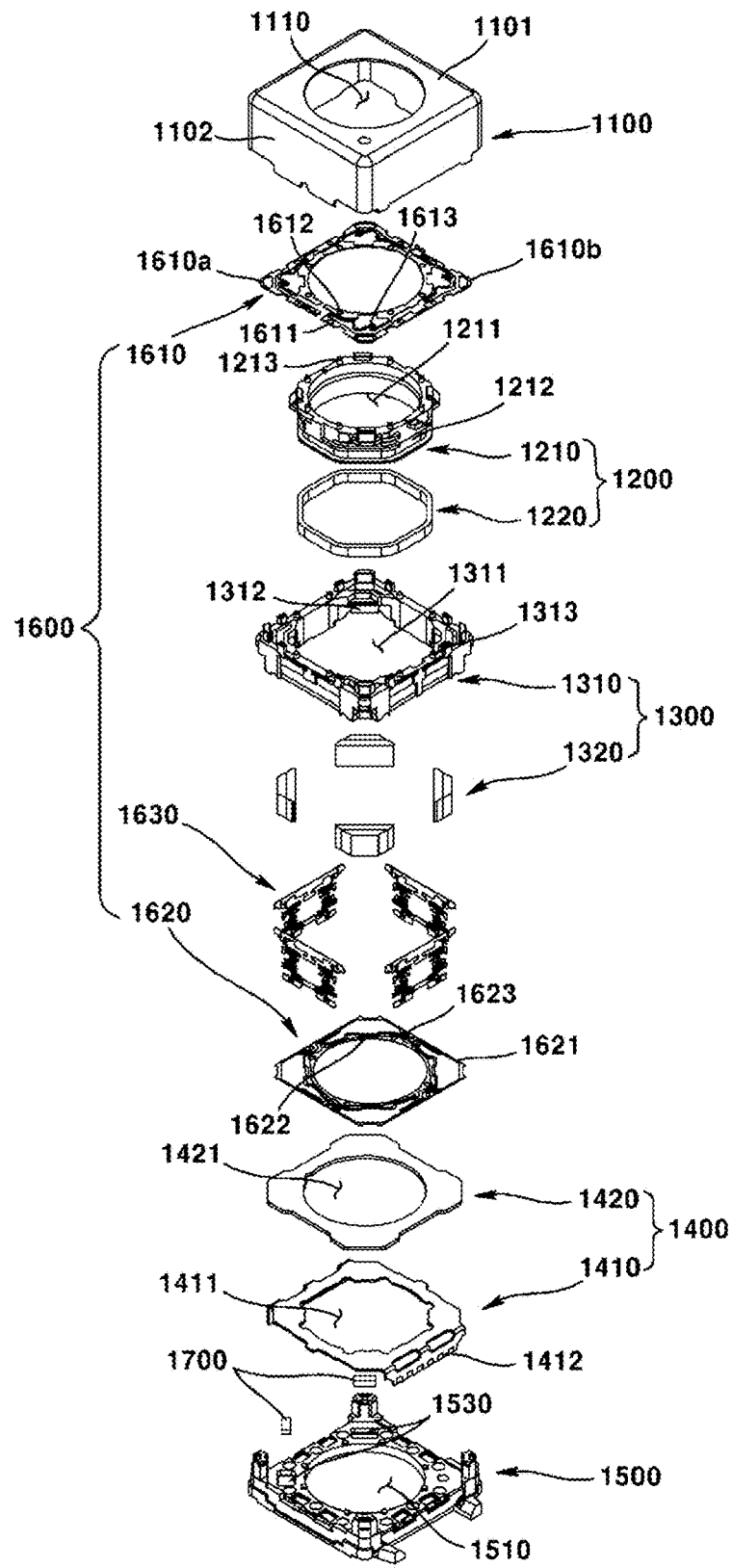
FIG. 9 is an exploded perspective view illustrating a lens driving device according to an exemplary embodiment of the present disclosure.
Figure 10:
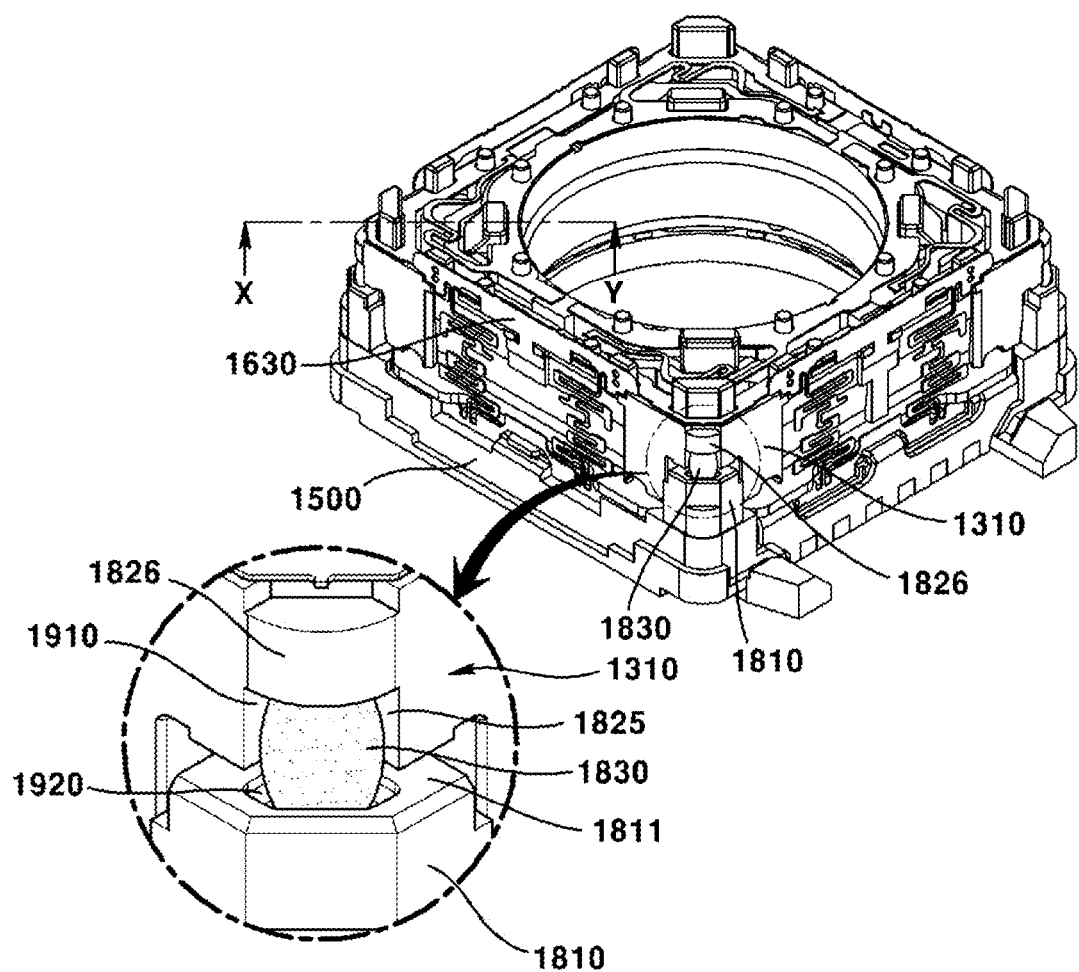
FIG. 10 is a schematic perspective view illustrating a lens driving device less a cover member according to an exemplary embodiment of the present disclosure.
Figure 11:
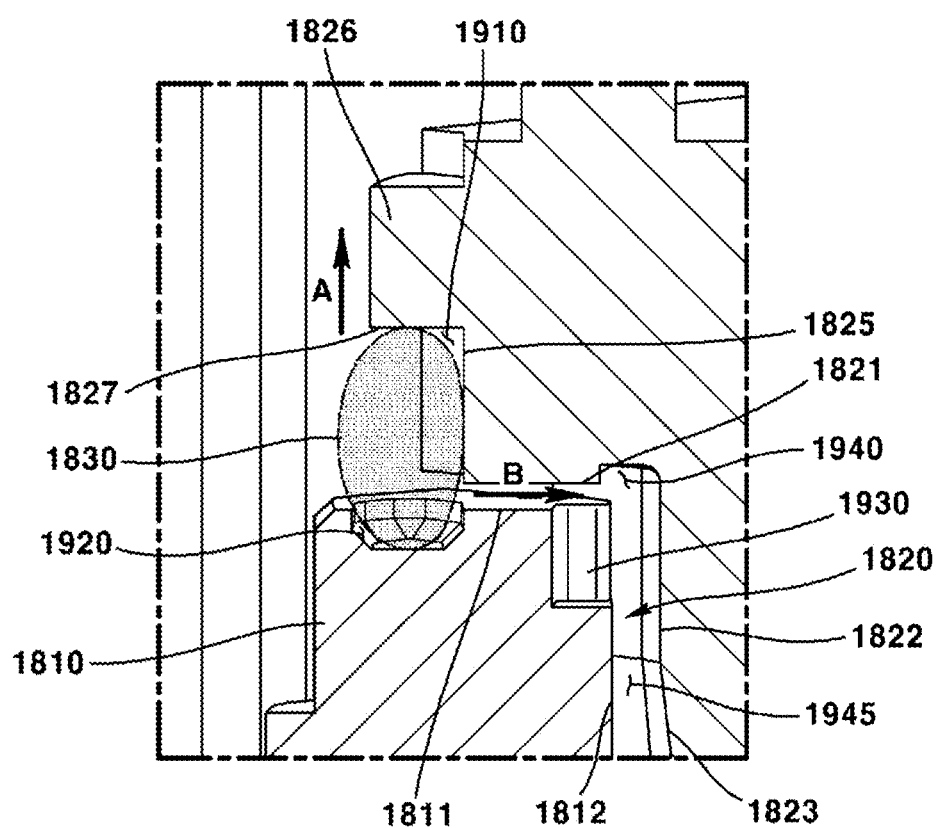
FIG. 11 is a cross-sectional view taken along line A-B of FIG. 10.
Figure 12:
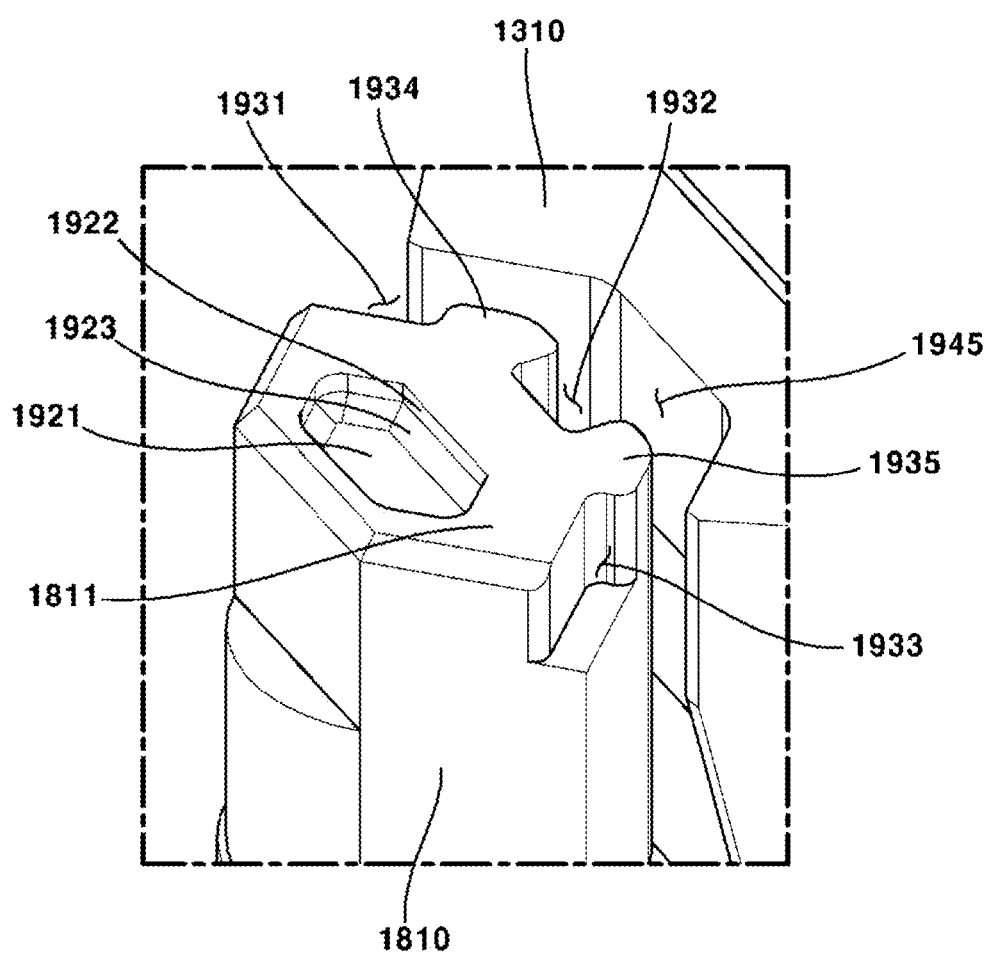
FIG. 12 is a schematic perspective view illustrating a part of a lens driving device according to an exemplary embodiment of the present disclosure.
Figure 13:
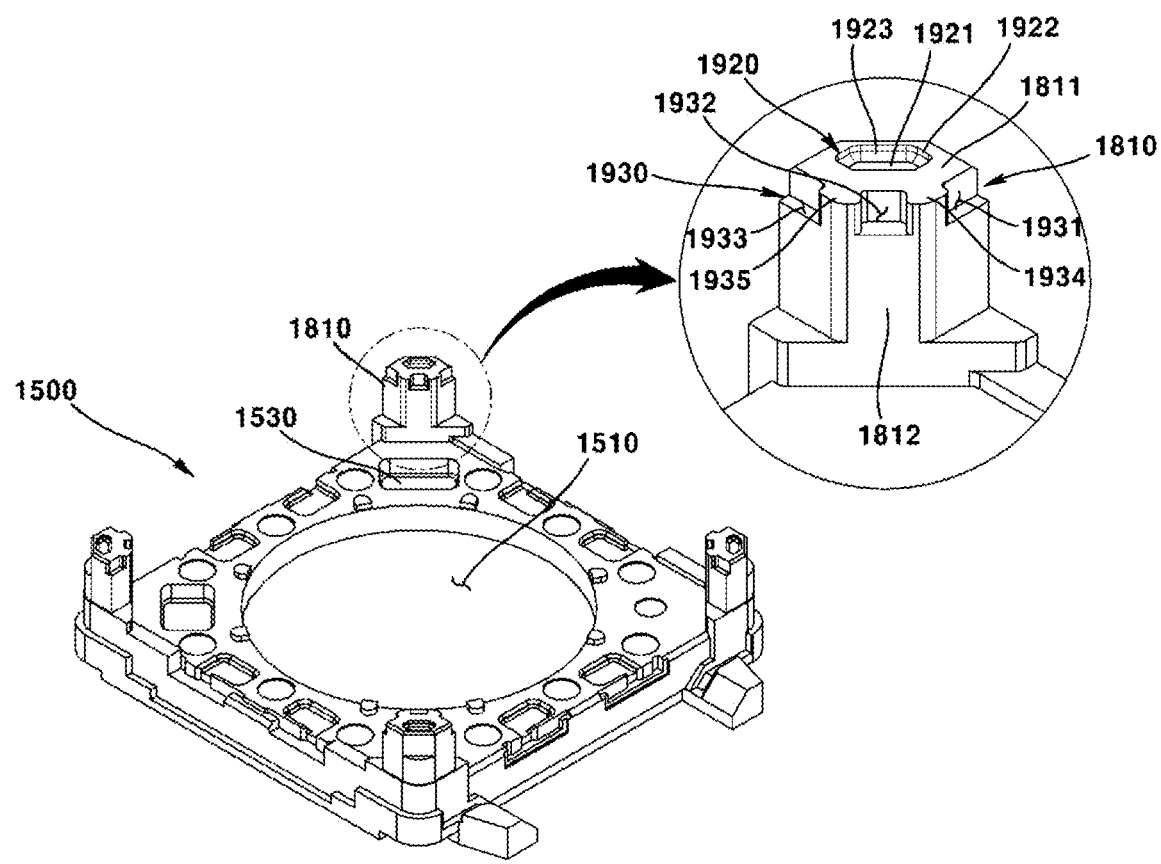
FIG. 13 is a schematic perspective view and a partially enlarged view illustrating a base and a part of a lens driving device according to an exemplary embodiment of the present disclosure.
Figure 14:
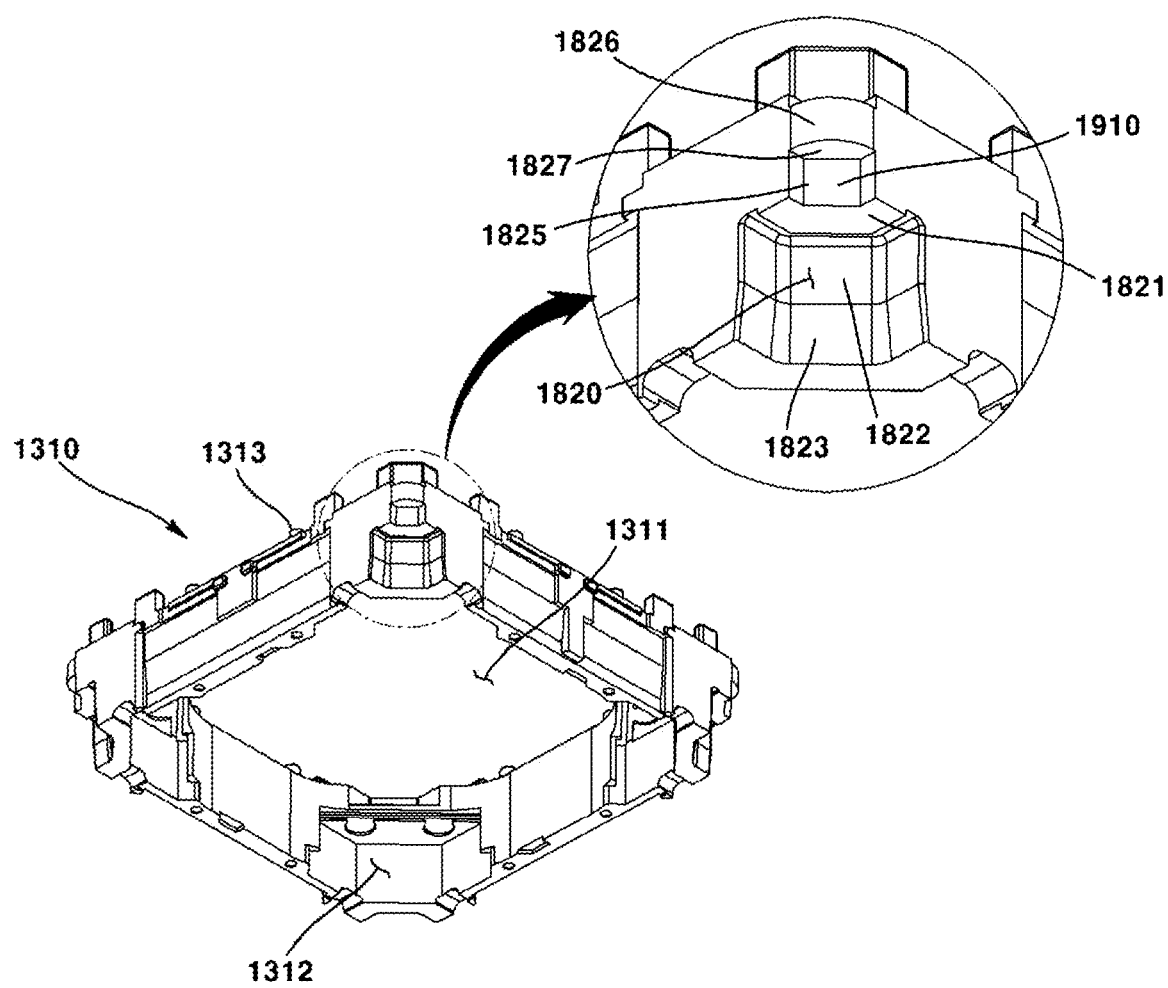
FIG. 14 is a schematic bottom surface perspective view and a partially enlarged view illustrating a house of a lens driving device according to an exemplary embodiment of the present disclosure.

FIG. 8 is a schematic perspective view illustrating a lens driving device according to an exemplary embodiment of the present disclosure, FIG. 9 is an exploded perspective view illustrating a lens driving device according to an exemplary embodiment of the present disclosure, FIG. 10 is a schematic perspective view illustrating a lens driving device less a cover member according to an exemplary embodiment of the present disclosure, FIG. 11 is a cross-sectional view taken along line A-B of FIG. 10, FIG. 12 is a schematic perspective view illustrating a part of a lens driving device according to an exemplary embodiment of the present disclosure, FIG. 13 is a schematic perspective view and a partially enlarged view illustrating a base and a part of a lens driving device according to an exemplary embodiment of the present disclosure, and FIG. 14 is a schematic bottom surface perspective view and a partially enlarged view illustrating a house of a lens driving device according to an exemplary embodiment of the present disclosure.

Referring to FIGS. 8 to 14, the driving device (1010) according to an exemplary embodiment of the present disclosure may include a cover member (1100), a first mover (1200), a second mover (1300), a stator (1400), a base (1500), a support member (1600), and a sensor unit (1700). However, the lens driving device (1010) according to an exemplary embodiment of the present disclosure may omit one or more elements from the cover member (1100), the first mover (1200), the second mover (1300), the stator (1400), the base (1500), the support member (1600), and the sensor unit (1700).

The cover member (1100) may constitute an external look of the lens driving device (1010). The cover member (1100) may take a hexahedron shape opened at the bottom. However, the shape is not limited thereto. The cover member (1100) may include an upper surface (1101), and a lateral surface (1102) extended from an outside of the upper surface (1101) to a lower side. Meantime, the cover member (1100) may be mounted at an upper surface of the base (1500). An inner space formed by the cover member (1100) and the base (1500) may be disposed with the first mover (1200), the second mover (1300), the stator (1400) and the support member (1600). Furthermore, the cover member (1100) may be mounted on the base (1500) by being adhered to, at an inner lateral surface, to a part of the lateral surface or to the whole lateral surface of the base (1500), through which configuration, the cover member (1100) can protect an inner elements against the external shock and function as an infiltration prevention of external pollutant materials.

The cover member (1100) may perform a function of a shield can by being equipped with a metal material, for example. To be more specific, the cover member (1100) may be formed with a metal plate material. In this case, the cover member (1100) can be protected from an electronic interference. That is, the cover member (1100) can protect the elements of the lens driving device (1010) against an external electronic interference generated from a mobile phone and the like. However, the material of cover member (1100) is not limited thereto.

The cover member (1100) may include an opening (1100) exposing a lens module by being formed at an upper surface. The opening (1110) may take a shape corresponding to that of the lens module. That is, the light introduced through the opening (1100) can pass through the lens module. Meantime, the light having passed through the lens module may be transmitted to an image sensor.

The first mover (1200) may include a bobbin (1210) and a first driving unit (1220). The first mover (1200) may be coupled to a lens module {note that the lens module may be explained as an element of the lens driving device (1010), one of the elements of camera module. That is, the lens module may be disposed at an inner side of the first mover (1200). In other words, an inner surface of the first mover (1200) may be coupled by an outside of the lens module. Meantime, the first mover (1200) may integrally move with the lens module through interaction with the second mover (1300). That is, the first mover (1200) can move the lens module.

The first mover (1200) may include the bobbin (1210). Furthermore, the first mover (1200) may include a first driving unit (1220) coupled to the bobbin (1210). The bobbin (1210) may be coupled to the lens module. To be more specific, an inner side of the bobbin (1210) may be coupled to an outside of the lens module. Meantime, the bobbin (1210) may be coupled by the first driving unit (1220). Furthermore, the bobbin (1210) may be coupled at a lower side with a lower support member (1620), and the bobbin (1210) may be coupled at an upper surface with an upper support member (1610). The bobbin (1210) may be disposed at an inner side of a housing (1310). The bobbin (1210) may move relative to the housing (1310).

The bobbin (1210) may include a lens coupling unit (1211) formed at an inside. The lens coupling unit (1211) may be coupled by the lens module. The lens coupling unit (1211) may be formed at an inner circumferential surface with a screw thread having a shape corresponding to that formed at an outer circumferential surface of the lens module. That is, the inner circumferential surface of the lens coupling unit (1211) may be screw-connected by the outer circumferential surface of the lens module.

The bobbin (1210) may include a sensor guide unit (not shown) coupled by an auto focus feedback sensor (not shown). The auto focus feedback sensor may integrally move with the bobbin (1210) and sense the movement of bobbin (1210) by sensing the second driving element (1320) mounted on the housing (1310). For example, the auto focus feedback sensor may be a Hall sensor and the second driving element (1320) may be a magnet.

The bobbin (1210) may include a first driving element coupling unit (1212) wound by or mounted with the first driving element (1220). The first driving element coupling unit (1212) may be formed in an integral shape with an external lateral surface of the bobbin (1210). Furthermore, the first driving element coupling unit (1212) may be continuously formed along the external lateral surface of the bobbin (1210) or formed spaced apart from the external lateral surface of bobbin (1210) at a predetermined distance. The first driving element coupling unit (1212) may include a recessed part formed by a part of the external lateral surface of bobbin (1210) being concaved. The first driving element (1220) disposed at the first driving element coupling unit (1212) may be supported by a support part protruded from a bottom surface of the recessed part to outside.

The bobbin (1210 may include an upper coupling unit (1213) coupled with an upper support member (1610). The upper coupling unit (1213) may be coupled to an inner lateral unit (1612) of the upper support member (1610). For example, the upper coupling unit (1213) formed by a lug may be inserted and coupled to a groove or a hole of the inner lateral unit (1612). Meantime, the upper support member (1610) may be formed with a lug and the bobbin (1210) may be formed with a groove, where the lug and the groove may be coupled. Meantime, the bobbin (1210) may include a lower coupling unit (not shown) coupled with a lower support member (1620). The lower coupling unit formed at a lower surface of the bobbin (1210) may be coupled to an inner lateral unit (1622) of the lower support member (1620). For example, the lower coupling unit formed by a lug may be inserted and coupled to a groove or a hole of the inner lateral unit (1622).

The first driving element (1220) may be disposed at a position opposite to the second driving element (1320) of the second mover (1300). The first driving element (1220) may move the bobbin (1210) relative to the housing (1310) through electromagnetic interaction with the second driving element (1320). The first driving element (1220) may include a coil. The coil may be guided to the first driving element coupling unit (1212) to be wound on a periphery of the bobbin (1210). Furthermore, in another exemplary embodiment, the coil may be configured in a manner such that four coils are independently disposed where adjacent two coils constitute a 90° angle therebetween and arranged on the periphery of the bobbin (1210). When the first driving element (1220) includes a coil, an electric power supplied to the coil may be supplied through the upper support member (1610).

At this time, the upper support member (1610) may be divided to a pair in order to supply an electric power to the coil. Meantime, the first driving element (1220) may include a pair of lead cables (not shown) in order to supply an electric power. In this case, each of the pair of lead cables in the first driving element may be electrically coupled to a pair of upper support members (1610*a*, 1610*b*). Meantime, in another exemplary embodiment, the first driving element (1220) may include a magnet. In this case, the second driving element (1320) may be formed with a coil.

The second mover (1300) may be disposed at an outside of the first mover (1200) opposite to the first mover (1200). The second mover (1300) may be supported by the base (1500) disposed at a lower side thereof. The second mover (1300) may be disposed at an inner space of the cover member (1100).

The second mover (1300) may include a housing (1310) disposed at a periphery of the bobbin (1210). Furthermore, the housing (1310) may be formed with an insulating material, and may be injection molded in consideration of productivity. The housing (1310) is a part moving for an OIS (Optical Image Stabilization) driving, and may be discretely arranged from the cover (100) at a predetermined distance. However, in an AF model, the housing (1310) may be fixed on the base (1500). Furthermore, in the AF model, the housing (1310) may be omitted and magnet disposed as the second driving element (1320) may be fixed on the cover member (1100).

The housing (1310) may be opened at an upper side and a bottom side to movably and vertically accommodate the first mover (1200). The housing (1310) may include at an inner side an upper/bottom opened inner lateral space (1311). The inner lateral space may be movably disposed with the first mover (1200). That is, the inner lateral space may be formed with a shape corresponding to that of the first mover (1200). Furthermore, the inner lateral space (1311) may be disposed at a periphery thereof spaced apart from the periphery of the first mover (1200).

The housing (1310) may include a second driving unit coupling unit (1312) formed in a shape corresponding to that of the second driving element (1320) to accommodate the second driving element (1320). That is, the second driving unit coupling unit (1312) may fix the second driving element (1320) by accommodating the second driving element (1320). The second driving element (1320) may be fixed to the second driving unit coupling unit (1312) by adhesive (not shown). Meantime, the second driving unit coupling unit (1312) may be disposed at an inner circumferential surface of the housing (1310). In this case, there is an advantage of electromagnetic interaction with the first driving element (1220) disposed at an inner lateral side of the second driving element (1320).

Furthermore, the second driving unit coupling unit (1312) may be opened at a bottom surface, for example. In this case, there is an advantage of electromagnetic interaction with the second driving element (1320) disposed at a lower side of the second driving element (1320) and a fourth driving element (1420). The second driving unit coupling unit (1312) may be formed in four (4) pieces. Each of the four second driving unit coupling units (1312) may be coupled by the second driving element (1320). Meantime, each of the four second driving unit coupling units (1312) may be arranged at a corner area of the housing (1310).

The housing (1310) may be coupled at an upper surface thereof with the upper support member (1610), and may be coupled at a lower surface thereof with the lower support member (1620). The housing (1310) may include an upper coupling unit (1313) coupled to the upper support member (1610). The upper coupling unit (1313) may be coupled to an external lateral unit (1611) of the upper support member (1610). For example, the upper coupling unit (1313) formed by a lug may be coupled by being inserted into a hole or a groove of the external lateral unit (1611). Meantime, in another exemplary embodiment, the upper support member (1610) may be formed with a lug and the housing (1310) may be formed with a groove, whereby the lug and groove may be coupled together. Meantime, the housing (1310) may include a lower coupling unit (not shown) coupled to the lower support member (1620). The lower coupling unit formed at a lower side of the housing (1310) may be coupled to an external lateral unit (1621) of the lower support member (1620). For example, the lower coupling unit formed with a lug may be coupled by being inserted into a hole or a groove of the external lateral unit (1621).

The second driving unit (1320) may be formed opposite to the first driving element (1220) of the first mover (1200). The second driving unit (1320) may move the first driving unit (1220) through the electromagnetic interaction with the first driving unit (1220). The second driving unit (1320) may include a magnet. The magnet may be fixed to the second driving unit coupling units (1312) of the housing (1310). The second driving unit (1320) may, as illustrated in FIG. 9, be configured in a manner such that four magnets are independently disposed, and two adjacent magnets may form a 90° therebetween and be arranged at the housing (1310). That is, the second driving unit (1320) may promote an effective use of inner volume by being mounted four (4) lateral surfaces of housing (1310) each at an equidistant gap. Furthermore, the second driving unit (1320) may be arranged at four corner areas of the housing (1310). Meantime, the second driving unit (1320) may be adhered to the housing (1310) using an adhesive, but the present disclosure is not limited thereto. Meantime, in another exemplary embodiment, the first driving unit (1220) may include a magnet, and the second driving unit (1320) may include a coil.

The stator (1400) may be disposed opposite to a lower side of the second mover (1300). Meantime, the stator (1400) may move the second mover (1300). Furthermore, the stator (1400) may be centrally disposed with through holes (1411, 1421) corresponding to the lens module. The stator (1400) may include a circuit board (1410) disposed between the third driving unit (1420) and the base (1500). Furthermore, the stator (1400) may include a third driving unit (1420) disposed opposite to the lower side of the second driving unit (1320). The circuit board (1410) may include an FPCB (Flexible PCB, 420) which is a flexible board.

The circuit board (1410) may be interposed between the third driving unit (1420) and the base (1500). Meantime, the circuit board (1410) may supply an electric power to the third driving unit (1420). Furthermore, the circuit board (1410) may supply an electric power to the first driving unit (1220) through the lateral support member (1630) and the upper support member (1610). The circuit board (1410) may include a through hole (1411) to pass a light having passed the lens module. Furthermore, the circuit board (1410) may include a terminal unit (1412) that is exposed to the outside by being bent. The terminal unit (1412) may be connected to an outside power, through which an electric power can be supplied to the circuit board (1412).

The third driving unit (1420) may include a coil. When a power is applied to the coil of the third driving unit (1420), the second driving unit (1320) and housing (1310) fixed by the second driving unit (1320) may be integrally moved by the interaction with the second driving unit (1320). The third driving unit (1420) may be mounted on the circuit board (1410) or may be electrically connected to the circuit board (1410). Meantime, the third driving unit (1420) may be disposed with a through hole (1421) to pass a light of the lens module. Furthermore, in consideration of miniaturization of the lens driving device (reduction of height to z axis direction which is an optical axis direction), the third driving unit (1420) may be arranged or mounted on the circuit board (1410) by being formed with an FP coil which is an FP coil.

The base (1500) may support the second mover (1300). The base (1500) may be disposed at a lower side with a PCB. The base (1500) may include a through hole (1510) formed at a position corresponding to that of the lens coupling unit (1211) of the bobbin (1210). In this case, the base (1500) may function as a sensor holder protecting an image sensor. The base (1500) may be disposed with an IR (Infrared Ray) filter. The through hole (1510) of the base (1500) may be coupled by the IR filter.

The base (500) may include a foreign object collecting unit to collect foreign objects introduced into the cover member (1100), for example. The foreign object collecting unit may be disposed at an upper surface of the base (1500), may include an adhesive material and may collect foreign objects in an inner space formed by the cover member (1100) and the base (1500). The base (1500) may include a sensor accommodation unit (1530) coupled by the sensor unit (1700). That is, the sensor unit (1700) may be mounted on the sensor accommodation unit (1530). At this time, the sensor unit (1700) may detect a horizontal movement of the housing (1310) by detecting the second driving unit (1320) coupled to the housing (1310). The sensor accommodation unit (1530) may be formed in two pieces, for example. Each of the two sensor accommodation units (1530) may be disposed with the sensor unit (1700). In this case, the sensor unit (1700) may be arranged to detect the x axis and y axis direction movements of the housing (1310).

The support member (1600) may connect at least two elements of the first mover (1200), the second mover (1300) and the base (1500). The support member (1600) may elastically connect at least two elements of the first mover (1200), the second mover (1300) and the base (1500) to allow a relative movement of each element. That is, the support member (1600) may be formed with an elastic member. The support member (1600) may include an upper support member (1610), a lower support member (1620) and a lateral support member (1630). Meantime, a separate conductive member (not shown) apart from the support member (1600) may be disposed to electrically connect any of the two elements from the upper support member (1610), the lower support member (1620) and the lateral support member (1630).

The upper support member (1610) may include an outside lateral unit (1611), an inner lateral unit (1612) and a connector (1613), for example. The upper support member (1610) may include an outside lateral unit (1611) coupled to the housing (1310), an inner lateral unit (1612) coupled to the bobbin (1210) and a connector (1613) elastically connecting the outside lateral unit (1611) and the inner lateral unit (1612).

The upper support member (1610) may be connected to an upper surface of the first mover (1200) and an upper surface of the second mover (1300). To be more specific, an inner lateral unit (1612) of the upper support member (1610) may be coupled to an upper coupling unit (1213) of the bobbin (1210) and an outer lateral unit (1611) of the upper support member (1610) may be coupled to an upper coupling unit (1313) of the housing (1310).

The upper support member (1610) may be disposed by being divided into a pair according to an exemplary embodiment of the present disclosure. That is, the upper support member (1610) may include a first upper support member (1610a) and a second upper support member (1610b). At this time, each of the first upper support member (1610a) and the second upper support member (1610b) can supply an electric power by being connected to a pair of lead cables (withdrawal wires) each formed with a coil. In other words, the pair of upper support members (1610a, 1610b) may be used for applying an electric power to the first driving unit (1220). Meantime, the upper support member (1610) may receive an electric power from the circuit board (1410) through the lateral support member (1630), for example. That is, the first driving unit (1220) may receive the electric power from the circuit board (1410) through the lateral support member (1630) and the upper support member (1610).

The lower support member (1620) may include an outside lateral unit (1621), an inner lateral unit (1622) and a connector (1623), for example. The lower support member (1620) may include an outside lateral unit (1621) coupled to the housing (1310), an inner lateral unit (1622) coupled to the bobbin (1210) and a connector (1623) elastically connecting the outside lateral unit (1621) and the inner lateral unit (1622).

The lower support member (1620) may be connected to a lower surface of the first mover (1200) and a lower surface of the second mover (1300). To be more specific, the lower support member (1620) may be connected to a lower surface of the bobbin (1210) and to a lower surface of the housing (1310). An inner lateral unit (1622) of the lower support member (1620) may be coupled to a lower coupling unit of the bobbin (1210) and an outer lateral unit (1621) of the lower support member (1620) may be coupled to a lower coupling unit of the housing (1310).

The lateral support member (1630) may be fixed at one end to the stator (1400) or the base (1500), and may be fixed at the other end to the upper support member (1610) or the second mover (1300). The lateral support member (1630) may be coupled at one side to the base (1500) and coupled at the other side to the housing (1310), for example. Furthermore, in another exemplary embodiment, the lateral support member (1630) may be coupled at one side to the stator (1400), and may be coupled at the other side to the upper support member (1610). The lateral support member (1630) may elastically support the second mover (1300) relative to the base (1500) to horizontally move or tilt the second mover (1300).

The lateral support member (1630) may be a leaf spring, for example. The lateral support member (1630) may include leaf springs respectively disposed at four external surfaces of the housing (1310), for example. Meantime, the lateral support member (1630) may include a plurality of wires, for example. At this time, the number of plurality of wires may be six (6) or eight (8).

The lateral support member (1630) may include a configuration for shock absorption by being coupled to the upper support member (1610), for example. The configuration for shock absorption may be formed at more than one of the lateral support member (1630) and the upper support member (1610). The configuration for shock absorption may be a separate member like a damper (not shown). Furthermore, the configuration for shock absorption may be always realized through shape change on any one of the lateral support member (1630) and the upper support member (1610).

The sensor unit (1700) may be used for at least one of AF (Auto Focus) feedback and/or OIS (Optical Image Stabilization) feedback. That is, the sensor unit (1700) may detect at least one of the position and/or movement of the first mover (1200) and/or second mover (1300). The sensor unit (1700) may provide information for OIS feedback by detecting horizontal movement and tilt of the second mover (1300), for example. The sensor unit (1700) may be disposed at the stator (1400). The sensor unit (1700) may be disposed at an upper surface or a lower surface of the circuit board (1410). The sensor unit (1700) may be disposed at a sensor accommodation groove (1530) formed at the base (1500) by being arranged at a lower surface of a circuit board, for example. The sensor unit (1700) may include a Hall sensor according to an exemplary embodiment of the present disclosure. In this case, the sensor unit (1700) may sense the magnetic field of the second movable element (1320) to sense a relative movement of the second mover (1300) relative to the stator (1400). The sensor unit (1700) may be formed more than two elements to sense all the movements of x axis direction and y axis direction of the second mover (100).

The lens driving device (1010) according to an exemplary embodiment of the present disclosure may include a base (1500), a housing (1310) disposed at an upper surface of the base (1500) to be movably supported relative to the base (1500), a pillar unit (1810) protruded upward from the base (1500), a pillar accommodation unit (1820) formed at the housing (1310) and disposed by the pillar unit (1810) and a damper (1830) arranged between the pillar unit (1810) and the housing (1310).

The pillar unit (1810) may be disposed at a corner of the base (1500), for example. That is, the pillar unit (1810) may be disposed at each corner of four (4) corners of the base (1500). Meantime, an inner side of the pillar unit (1810) may accommodate at least a part of the housing (1310). That is, the pillar unit (1810) may accommodate the housing (1500) at an inside to limit a moving distance of the housing (1310).

The pillar unit (1810) may include an upper surface (1811) and an inner lateral surface (1812), for example. The upper surface (1811) and the inner lateral surface (1812) may be so disposed as to be orthogonal. However, a corner joined by the upper surface (1811) and the inner lateral surface (1812) may disposed with a slope. The upper surface of the pillar unit (1810) may be formed opposite to a first surface (1821) of the pillar accommodation unit (1820). Furthermore, the inner lateral surface (1812) of the pillar unit (1810) may be formed opposite to a second surface (1822) of the pillar accommodation unit (1820).

The pillar accommodation unit (1820) may include a first surface (1821), a second surface (1822) and a slope (1823), for example. The pillar accommodation unit (1820) may include the first surface (1821) opposite to the upper surface (1811) of the pillar unit (1810), and the second surface (1822) opposite to the inner lateral surface (1812) of the pillar unit (1810). The damper (1830) may be interposed between the first surface (1821) of the pillar accommodation unit (1820) and the upper surface (1811) of the pillar unit (1810), provided however, the damper (1830) may be explained to be disposed between an external lateral surface (1825) of the housing (1310) and an upper surface of the pillar unit (1810). A discrete space (1945) may be disposed between the second surface (1822) of the pillar accommodation unit (1820) and an inner lateral surface (1812) of the pillar unit (1810). The discrete space (1945) may provide a movable space for the housing (1310). Meantime, an area corresponding to an upper side of the discrete space (1945) on the first surface (1821) of the pillar accommodation unit (1820) may be disposed with a fourth groove (1940).

The pillar accommodation unit (1820) may include a slope (1823) sloping inwardly as at least a part of the second surface (1822) descends downward, for example. In this case, the pillar unit (1810) strikes the second surface (1822) of the pillar accommodation unit (1820) to inhibit the second driving unit (1320) disposed inside the housing (1310) from being detached. To be more specific, when the slope (1823) is omitted from the second surface (1822) of the pillar accommodation unit (1820), and when a shock is applied from outside to the lens driving device (1010), the pillar unit (1810) may strike a lower distal end of the second surface (1822). At this time, the shock is concentrated on a lower side of the second driving unit (1320) adhered to an inner lateral surface of the housing (1310) to generate a detachment phenomenon in order to be opened to an inside direction and a lower side direction. At this time, the slope (1823) is configured such that the pillar unit (1810) strikes an area joined by the second surface (1822) and the slope (1823) to disperse the shock to an upper side or a central side of the second driving unit (1320), whereby the second driving unit (1320) is inhibited from being detached.

The pillar accommodation unit (1820) may be disposed at an upper surface with an external lateral surface (1825) of the housing (1310). Meantime, the external lateral surface (1825) of the housing (1310) may be disposed with a loss prevention unit (1826) protrusively formed to an outside. At this time, the external lateral surface (1825) of the housing (1310) and a lower surface (1827) of the loss prevention unit (1826) may form a first groove (1910) disposed with the damper (1830). That is, the damper (1830) may be disposed at a space formed by the upper surface (1811) of the pillar unit (1810), the external lateral surface (1825) of the housing (1310) and the lower surface (1827) of the loss prevention unit (1826).

The damper (1830) may be disposed between the pillar unit (1810) and the housing (1310). Furthermore, the damper (1830) may be arranged between the pillar unit (1810) and the pillar accommodation unit (1820), for example. Meantime, the damper (1830) may include a material having a viscosity, for example, whereby the phenomenon of the support member (1600) generating an oscillation at the resonant frequency during performance of AF feedback function or OIS feedback function can be inhibited. The shape of damper (1830) is not limited thereto, and may take any form that elastically connecting the pillar unit (1810) and the housing (1310).

The lens driving device (1010) according to an exemplary embodiment of the present disclosure may include at least one of a first groove (1910) disposed with the damper (1830) and a second groove (1920). In the first exemplary embodiment, the first groove (1910) and the second groove (1920) may be also explained as a loss prevention configuration of damper (1830). Furthermore, the lens driving device (1010) according to an exemplary embodiment of the present disclosure may include at least one of a third groove (1930) and a fourth groove (1940) in order to keep the OIS function performance even if the damper (1830) is lost. If the damper (1830) is lost between the first surface (1821) of the pillar unit (1810) and the second surface (1822) of the pillar accommodation unit (1820), the first surface (1821) of the pillar unit (1810) and the second surface (1822) of the pillar accommodation unit (1820) may drop while being adhered for a while as the housing (1310) moves to inhibit a proper performance of OIS function. That is, the third groove (1930) and the fourth groove (1940) function to guide lest the damper (1830) should be lost between the inner lateral surface (1812) of the pillar unit (1810) and the second surface (1822) of the pillar accommodation unit (1820).

The first groove (1910) may be disposed on the first surface (1821) of the pillar accommodation unit (1820).

However, the first groove (1910) may be explained to be disposed at the external lateral surface (1825) of the housing (1310). The first groove (1910) may be disposed at a corner area joined by the external lateral surface (1825) of the housing (1310) and the first surface (1821), for example. The first groove (1910) may be disposed with the damper (1830). The first groove (1910) may be formed by a lower surface (1827) of the loss prevention unit (1826) protruded from the external lateral surface (1825) of the housing (1310) to the outside, the external lateral surface (1825) of the housing (1310) and the upper surface (1811) of the pillar unit (1810).

The second groove (1920) may be arranged at the upper surface (1811) of the pillar unit (1810). The second groove (1920) may be formed by the upper surface (1811) of the pillar unit (1810) being concaved downward. The second groove (1920) may include a second groove upper surface (1921) parallel with the upper surface (1811) of the pillar unit (1810), a second groove lateral surface (1922) perpendicular to the upper surface (1811) of the pillar unit (1810), and a second groove slope (1923) slantly connecting the second groove upper surface (1921) and the second groove lateral surface (1922), for example.

The third groove (1930) may be formed at a corner area joined by the upper surface (1811) of the pillar unit (1810) and the inner lateral surface (1812). The third groove (1930) may include a plurality of recessed parts (1931, 1932, 1933) formed by the inner lateral surface (1812) of the pillar unit (1810) being concaved, and protruding parts (1934, 1935) disposed between the plurality of recessed parts (1931, 1932, 1933), for example. The third groove (1930) may include a first recessed part (1931), a second recessed part (1932) disposed adjacent to the first recessed part (1931), a third recessed part (1933) disposed adjacent to the second recessed part (1932), a first protrude (1934) disposed between the first and second recessed parts (1931, 1932), and a second protrude (1935) disposed between the second and third recessed parts (1932. 1933), for example.

The plurality of recessed parts (1931, 1932, 1933) of third groove (1930) may provide a space to accommodate the damper (1830). That is, the plurality of recessed parts (1931, 1932, 1933) may inhibit from moving close to between the inner lateral surface (1812) of the pillar unit (1810) and the second surface (1822) of the pillar accommodation unit (1820), even if the damper (1830) is lost between the upper surface (1811) of the pillar unit (1810) and the first surface (1821) of the pillar accommodation unit (1820).

Meantime, the protruding parts (1934, 1935) may limit a movable space or a movable distance of the housing (1310). Furthermore, the protruding parts (1934, 1935) may also function to inhibit the detachment phenomenon of second driving unit (1320) by striking so that the force of striking the second surface (1822) by the pillar unit (1810) can be dispersed.

The fourth groove (1940) may be disposed at the first surface (1821) of the pillar accommodation unit (1820). Meantime, the fourth groove (1940) may be disposed at an upper surface of a discrete space (1945) between the inner lateral surface (1812) of the pillar unit (1810) and the second surface (1822) of the pillar accommodation unit (1820). In this case, the fourth groove (1940) may function as a reserved accommodation space of the damper (1830) lest the damper (1830) move to close to between the inner lateral surface (1812) of the pillar unit (1810) and the second surface (1822) of the pillar accommodation unit (1820), even if the damper (1830) is lost between the upper surface (1811) of the pillar unit (1810) and the first surface (1821) of the pillar accommodation unit (1820).

Hereinafter, configuration of the lens driving device according to a modified exemplary embodiment of the present disclosure will be explained, and the previous exemplary embodiment is called a first exemplary embodiment.

The lens driving device (1010) according to a modified exemplary embodiment of the present disclosure may include a cover (1100), a first mover (1200), a second mover (1300), a stator (1400), a base (1500), a support member (1600), and a sensor unit (1700). The explanation of this configuration may be inferred from that of the first exemplary embodiment of the present disclosure.

The lens driving device (1010) according to a second exemplary embodiment of the present disclosure may include a first groove (1910).

The first groove (1910) may be disposed on the first surface (1821) of the pillar accommodation unit (1820). However, the first groove (1910) may be explained to be disposed at the external lateral surface (1825) of the housing (1310). The first groove (1910) may be disposed at a corner area joined by the external lateral surface (1825) of the housing (1310) and the first surface (1821), for example. The first groove (1910) may be disposed with the damper (1830). The first groove (1910) may be formed by a lower surface (1827) of the loss prevention unit (1826) protruded from the external lateral surface (1825) of the housing (1310) to the outside, the external lateral surface (1825) of the housing (1310) and the upper surface (1811) of the pillar unit (1810). That is, the first groove (1910) may provide an accommodation space for the damper (1830).

The lens driving device (1010) according to a third exemplary embodiment of the present disclosure may include a second groove (1920). The second groove (1920) may be arranged at the upper surface (1811) of the pillar unit (1810). The second groove (1920) may be formed by the upper surface (1811) of the pillar unit (1810) being concaved downward. The second groove (1920) may include a second groove upper surface (1921) parallel with the upper surface (1811) of the pillar unit (1810), a second groove lateral surface (1922) perpendicular to the upper surface (1811) of the pillar unit (1810), and a second groove slope (1923) slantly connecting the second groove upper surface (1921) and the second groove lateral surface (1922), for example. That is, the second groove (1920) may provide an accommodation space for the damper (1830).

The lens driving device (1010) according to a fourth exemplary embodiment of the present disclosure may include a third groove (1930). The third groove (1930) may be formed at a corner area joined by the upper surface (1811) of the pillar unit (1810) and the inner lateral surface (1812). The third groove (1930) may include a plurality of recessed parts (1931, 1932, 1933) formed by the inner lateral surface (1812) of the pillar unit (1810) being concaved, and protruding parts (1934, 1935) disposed between the plurality of recessed parts (1931, 1932, 1933), for example. The third groove (1930) may include a first recessed part (1931), a second recessed part (1932) disposed adjacent to the first recessed part (1931), a third recessed part (1933) disposed adjacent to the second recessed part (1932), a first protrude (1934) disposed between the first and second recessed parts (1931, 1932), and a second protrude (1935) disposed between the second and third recessed parts (1932. 1933), for example. That is, The plurality of recessed parts (1931, 1932, 1933) of third groove (1930) may provide a space to accommodate the damper (1830). That is, the plurality of recessed parts (1931, 1932, 1933) may inhibit from moving close to between the inner lateral surface (1812) of the pillar unit (1810) and the second surface (1822) of the pillar accommodation unit (1820), even if the damper (1830) is lost between the upper surface (1811) of the pillar unit (1810) and the first surface (1821) of the pillar accommodation unit (1820).

Meantime, the protruding parts (1934, 1935) may limit a movable space or a movable distance of the housing (1310). Furthermore, the protruding parts (1934, 1935) may also function to inhibit the detachment phenomenon of second driving unit (1320) by striking so that the force of striking the second surface (1822) by the pillar unit (1810) can be dispersed. That is, the third groove (1930) may inhibit the AF and OIS functional characteristics of the lens driving device (1010) from being changed, even if the damper (1830) is lost between the base (1500) and the housing (1310) by being deviated from a proper position.

The lens driving device (1010) according to a fifth exemplary embodiment of the present disclosure may include a fourth groove (1940). The fourth groove (1940) may be disposed at the first surface (1821) of the pillar accommodation unit (1820). Meantime, the fourth groove (1940) may be disposed at an upper surface of a discrete space (1945) between the inner lateral surface (1812) of the pillar unit (1810) and the second surface (1822) of the pillar accommodation unit (1820). In this case, the fourth groove (1940) may function as a reserved accommodation space of the damper (1830) lest the damper (1830) move to close to between the inner lateral surface (1812) of the pillar unit (1810) and the second surface (1822) of the pillar accommodation unit (1820), even if the damper (1830) is lost between the upper surface (1811) of the pillar unit (1810) and the first surface (1821) of the pillar accommodation unit (1820). That is, the fourth groove (1940) may inhibit the AF and OIS functional characteristics of the lens driving device (1010) from being changed, even if the damper (1830) is lost between the base (1500) and the housing (1310) by being deviated from a proper position.

As discussed in the foregoing, the present disclosure may include all the first, second, third and fourth grooves (1910, 1920, 1930, 1940), and may include any one of the first, second, third and fourth grooves (1910, 1920, 1930, 1940). Furthermore, the lens driving device (1010) according to a sixth exemplary embodiment of the present disclosure may include a first groove (1910) and a third groove (1930). The lens driving device (1010) according to a seventh exemplary embodiment of the present disclosure may include a first groove (1910) and a fourth groove (1940). The lens driving device (1010) according to an eighth exemplary embodiment of the present disclosure may include a second groove (1920) and a third groove (1930). The lens driving device (1010) according to a ninth exemplary embodiment of the present disclosure may include a second groove (1920) and a fourth groove (1940). Meantime, even in a case not mentioned in the above explanation, a plurality of combinations including at least one of the first groove (1910) to the fourth groove (1940) may be included as an exemplary embodiment of the present disclosure.

Hereinafter, operation and effect of a camera module according to an exemplary embodiment of the present disclosure will be described with reference to the accompanying drawings.

First, auto focusing function of the camera module according to an exemplary embodiment of the present disclosure will be described. When an electric power is supplied to the first driving unit (1220), the first driving unit (1220) may perform a movement relative to the second driving unit (1320) in response to an electromagnetic interaction between the first driving unit (1220) and the second driving unit (1320) formed by a magnet. At this time, the bobbin (1210) coupled with the first driving unit (1220) may integrally move with the first driving unit (1220). That is, the bobbin (1210) coupled to an inner side of the lens module vertically moves relative to the housing (1310). The movement of bobbin (1210) thus discussed becomes a result of the lens module being nearer or distanced relative to an image sensor to thereby perform a focus adjustment to a subject.

Meantime, an auto focusing feedback may be applied to realize more accurate auto focusing function of the camera module according to an exemplary embodiment of the present disclosure. The auto focus feedback sensor (not shown) may detect a magnetic field of the second driving unit (1320) formed with a magnet. Meantime, when the bobbin (1210) implements a relative movement to the housing (1310), an amount of magnetic field detected by the auto focus feedback sensor is changed. The auto focusing feedback sensor transmits a detection value to a controller by detecting movement or position of bobbin (1210) to z axis direction using the method thus discussed. The controller determines whether to perform an additional movement to the bobbin (1210) through the received detection value. These processes are generated in real time, whereby the auto focusing function of the camera module according to an exemplary embodiment of the present disclosure can be more accurately performed through the auto focusing feedback.

Now, the OIS function of the camera module according to an exemplary embodiment of the present disclosure will be described.

When an electric power is supplied to the third driving unit (1420), the second driving unit (1320) may perform a movement relative to the third driving unit (1420) in response to an electromagnetic interaction between the third driving unit (1420) and the second driving unit (1320) formed by a magnet. At this time, the housing (1310) coupled with the second driving unit (1320) may integrally move with the second driving unit (1320). That is, the housing (1310) horizontally moves relative to the base (1500). Meantime, tilt of the housing (1310) relative to the base (1500) may be induced. The movement of housing (1310) thus discussed becomes a result of the lens module being moved to a direction parallel with a direction of the image sensor being laid relative to an image sensor to thereby perform an OIS function.

An OIS feedback may be applied in order to realize a more accurate OIS function of the camera module according to an exemplary embodiment of the present disclosure.

The pair of sensor units (1700) mounted on the base (1500) and formed by a Hall sensor detects a magnetic field of the second driving unit (1320) formed with a magnet fixed to the housing (1310). Meantime, when the housing (1310) implements a relative movement to the base (1500), an amount of magnetic field detected by the sensor unit (1700) is changed. The pair of sensor units (1700) transmits a detection value to a controller by detecting movement or position of housing (1310) to horizontal direction (x axis and y axis directions) using the method thus discussed. The controller determines whether to perform an additional movement to the housing (1310) through the received detection value. These processes are generated in real time, whereby the OIS function of the camera module according to an exemplary embodiment of the present disclosure can be more accurately performed through the OIS feedback.

In general, in order to implement an OIS function in a camera module, a lateral support member (1630) elastically connecting the housing (1310) to the base (1500) is essentially required, and when the OIS function is implemented, oscillation at the resonance point of the lateral support member (1630) cannot be avoided. However, the oscillation of elastic member can be inhibited through the damper (1830) in the camera module according to an exemplary embodiment of the present disclosure. To be more specific, the damper (1830) coated between the pillar unit (1810) of the base (1500) and the housing (1310) can inhibit the oscillation of the support member (1600) formed by an elastic member.

Furthermore, the camera module according to an exemplary embodiment of the present disclosure additionally includes a loss prevention structure of damper (1830) and the OIS function obtainment structure during loss of the damper (1830). The damper (1830) in the camera module according to an exemplary embodiment of the present disclosure is disposed at the first groove (1910) and the second groove (1920). At this time, the upward loss of the damper (1830) (see A of FIG. 11) can be inhibited by the loss prevention unit (1826). Furthermore, the inward loss of damper (1810) (see B of FIG. 11) can be also inhibited by the second groove (1920). Furthermore, the third and fourth grooves (1930, 1940) function as a reserved accommodation space of damper (1830) lest the damper (1830) move nearer to between the inner lateral surface (1812) of the pillar unit (1810) and the second surface (1822) of the pillar accommodation unit (1820).

As discussed in the foregoing, although all the elements forming the exemplary embodiments of the present disclosure are combined into one or operated as one element, the present disclosure is not limited thereto. That is, all the elements may be selectively combined or operated if within an object scope of the present disclosure. Furthermore, it will be understood that the terms "includes" and/or "including", "forming" and/or "formed" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

In the above, exemplary embodiments of the present disclosure have been described. However, these embodiments are merely examples and do not limit the present invention, so that persons who skilled in the art of the present disclosure may easily transform and modify within the limit of the technical spirit of the present disclosure. For example, each of the components shown in detail in the embodiments of the present invention may be implemented in transformation. In addition, the differences relating these transformations and modifications shall be regarded to be included in the scope of the present disclosure as defined in the attached claims of the present disclosure and the equivalents thereof.

The invention claimed is:

1. A lens driving device comprising:
    a cover member comprising an upper plate and a lateral plate extending from the upper plate;
    a bobbin disposed in the cover member;
    a housing disposed between the cover member and the bobbin;
    a magnet disposed in the cover member;
    a first coil facing the magnet and configured to move the bobbin in an optical axis direction;
    a stator comprising a base coupled with the lateral plate of the cover member, a circuit board disposed on the base, and a second coil disposed on the circuit board and facing the magnet; and
    a damper disposed between the housing and the base,
    wherein the second coil is configured to move the bobbin in a direction perpendicular to the optical axis direction, and
    wherein the damper is contacted with the housing and the stator.

2. The lens driving device of claim 1, wherein the damper connects the housing and the base.

3. The lens driving device of claim 1, wherein the damper comprises an adhesive material having a viscosity.

4. The lens driving device of claim 1, wherein the damper is spaced apart from the first coil, the magnet, the bobbin, and the cover member.

5. The lens driving device of claim 1, comprising:
    an upper elastic member connecting the bobbin and the housing; and
    a lateral support member connecting the upper elastic member and the base,
    wherein the damper is configured to reduce oscillations generated by the lateral support member.

6. The lens driving device of claim 5, wherein the damper is spaced apart from the upper elastic member and the lateral support member.

7. The lens driving device of claim 1, wherein the housing comprises a first groove formed on a first surface of the housing, and
    wherein at least a portion of the damper is disposed on the first groove of the housing.

8. The lens driving device of claim 7, wherein the base comprises a second surface facing the first surface of the housing, and a second groove formed on the second surface of the base, and
    wherein at least a portion of the damper is disposed on the second groove of the housing.

9. The lens driving device of claim 8, wherein the damper is disposed between the first groove of the housing and the second groove of the base.

10. The lens driving device of claim 7, wherein the first groove of the housing comprises a plurality of surfaces, and
    wherein the damper is contacted with at least two surfaces of the plurality of surfaces of the first groove.

11. The lens driving device of claim 1, wherein the damper comprises a plurality of dampers spaced apart from each other.

12. The lens driving device of claim 1, comprising a sensor disposed on the circuit board and configured to sense the magnet.

13. The lens driving device of claim 1, wherein the first coil is disposed on the bobbin,
wherein the magnet is disposed on the housing, and
wherein the damper is disposed between the housing and the base in the optical axis direction.

14. A camera module, comprising:
a Printed Circuit Board (PCB) mounted with an image sensor;
the lens driving device of claim 1; and
a lens coupled with the bobbin of the lens driving device and disposed over the image sensor.

15. An optical apparatus, comprising:
a supporting member;
the camera module of claim 14 disposed on the supporting member; and
a display unit disposed on the supporting member and configured to output an image captured by the camera module.

16. A lens driving device comprising:
a cover member comprising an upper plate and a lateral plate extending from the upper plate;
a bobbin disposed in the cover member;
a housing disposed between the cover member and the bobbin;
a magnet disposed in the cover member;
a first coil facing the magnet and configured to move the bobbin in an optical axis direction;
a base coupled with the lateral plate of the cover member;
a circuit board disposed on the base;
a second coil disposed on the circuit board and facing the magnet; and
a damper disposed between the housing and the base,
wherein the second coil is configured to move the bobbin in a direction perpendicular to the optical axis direction.

17. The lens driving device of claim 16, wherein the damper connects the housing and the base.

18. The lens driving device of claim 16, wherein the damper comprises an adhesive material having a viscosity.

19. The lens driving device of claim 16, wherein the housing comprises a first groove formed on a first surface of the housing,
wherein the base comprises a second surface facing the first surface of the housing, and a second groove formed on the second surface of the base, and
wherein the damper is disposed between the first groove of the housing and the second groove of the base.

* * * * *